(12) United States Patent
Singh et al.

(10) Patent No.: US 12,326,874 B2
(45) Date of Patent: Jun. 10, 2025

(54) DATA VISIBILITY FOR NESTED TRANSACTIONS IN DISTRIBUTED SYSTEMS

(71) Applicant: Microsoft Technology Licensing, LLC, Redmond, WA (US)

(72) Inventors: Sarvesh Singh, Issaquah, WA (US); Alan Dale Halverson, Verona, WI (US); Sandeep Lingam, Redmond, WA (US); Srikumar Rangarajan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/400,870

(22) Filed: Dec. 29, 2023

(65) Prior Publication Data
US 2024/0134880 A1    Apr. 25, 2024

Related U.S. Application Data

(63) Continuation of application No. 17/219,007, filed on Mar. 31, 2021, now Pat. No. 11,914,613.

(51) Int. Cl.
*G06F 16/27* (2019.01)
*G06F 9/46* (2006.01)
*G06F 16/901* (2019.01)

(52) U.S. Cl.
CPC .............. *G06F 16/27* (2019.01); *G06F 9/466* (2013.01); *G06F 16/9024* (2019.01)

(58) Field of Classification Search
CPC ....... G06F 16/27; G06F 16/9024; G06F 9/466
See application file for complete search history.

(56) References Cited

U.S. PATENT DOCUMENTS

2012/0124100 A1* 5/2012 Schabenberger ....... G06F 16/27 718/1
2016/0350356 A1* 12/2016 Vujic .................. G06F 16/2329
(Continued)

OTHER PUBLICATIONS

Communication pursuant to Article 94(3) received in European Application No. 22717691.4, mailed on Aug. 2, 2024, 5 pages.
(Continued)

*Primary Examiner* — Apu M Mofiz
*Assistant Examiner* — Farhad Agharahimi
(74) *Attorney, Agent, or Firm* — Weaver IP L.L.C.

(57) ABSTRACT

Methods for data visibility in nested transactions in distributed systems are performed by systems and devices. Distributed executions of queries are performed in processing systems according to isolation level protocols with unique nested transaction identifiers for data management and versioning across one or more data sets, one or more compute pools, etc., within a logical server via a single transaction manager that oversees the isolation semantics and data versioning. A distributed query processor of the systems and devices performs nested transaction versioning for distributed tasks by generating nested transaction identifiers, encoded in data rows, which are used to enforce correct data visibility. Data visibility is restricted to previously committed data from distributed transactions and tasks, and is blocked for distributed transactions and tasks that run concurrently. Local commits for completed transactions and tasks are used to minimize transaction manager interactions, and instant rollbacks are enabled for aborted transactions and tasks.

20 Claims, 7 Drawing Sheets

(56) References Cited

U.S. PATENT DOCUMENTS

2017/0371677 A1* 12/2017 Stanfill .................. G06F 9/466
2020/0034373 A1*  1/2020 Lee ..................... G06F 16/2365
2020/0218823 A1*  7/2020 Mizrakhi ............ G06F 16/1734
2021/0034571 A1*  2/2021 Bedadala .............. G06F 16/134

OTHER PUBLICATIONS

Communication under Rule 71(3) Received for European Application No. 22717691.4, mailed on Feb. 11, 2025, 8 pages.

* cited by examiner

DATA VISIBILITY FOR NESTED TRANSACTIONS IN DISTRIBUTED SYSTEMS

CROSS-REFERENCE TO RELATED APPLICATION(S)

The present application is a continuation of U.S. patent application Ser. No. 17/219,007, entitled "DATA VISIBILITY FOR NESTED TRANSACTIONS IN DISTRIBUTED SYSTEMS," filed on Mar. 31, 2021, the entirety of which is incorporated by reference herein.

BACKGROUND

Commercial database systems and data warehouses execute queries having extended execution times against large tables of data. Such queries may be received and executed while other queries are currently running, and this concurrency leads to operations on changed data by the executing queries that are not intended or desired. Additional issues, such as maintaining Halloween protection during query operations on data in tables, becomes problematic in these scenarios, as does the management of transactions and data versioning with the scaling of these systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for data visibility in nested transactions in distributed systems are performed by systems and devices. Distributed executions of queries are performed in a processing system according to an isolation level protocol with unique nested transaction identifiers for data management and data versioning across one or more data sets, one or more compute pools, etc., within a logical server via a single transaction manager that oversees the isolation semantics and data versioning. A distributed query processor performs nested transaction versioning for distributed tasks to be performed by distributed compute nodes by generating nested transaction identifiers, encoded in data rows, which are used to enforce correct data visibility. Data visibility is restricted to previously committed data from distributed transactions and tasks under a common root transaction parent, and is blocked for distributed transactions and tasks that run concurrently thus providing built-in Halloween protection for transactions and tasks. Local commits for completed transactions and tasks are used to minimize transaction manager interactions, and instant rollbacks are enabled for aborted transactions and tasks. The nested transaction versioning described is also enabled under isolation level protocols governed by a transaction manager.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
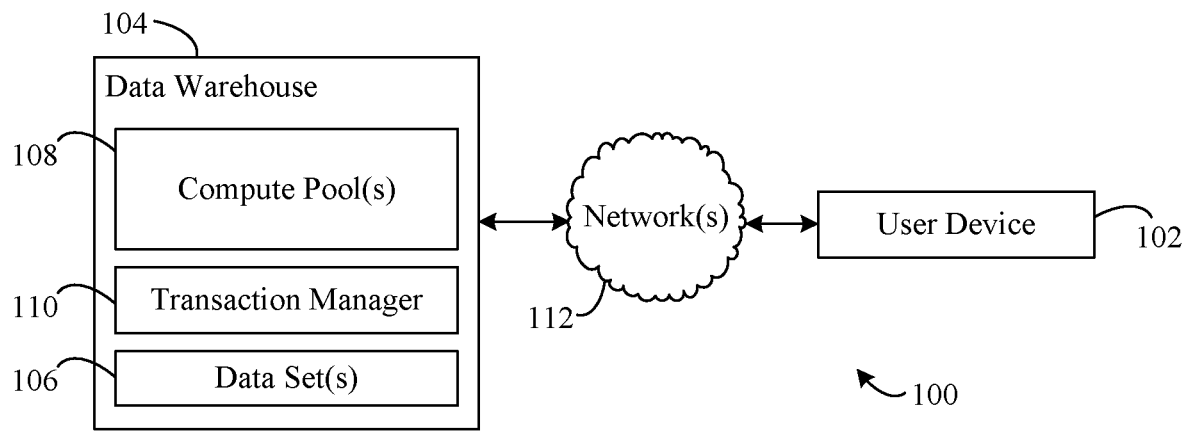
FIG. 1 shows a block diagram of a computing system for data visibility in nested transactions in distributed systems, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner Additionally, the drawings may not be provided to scale, and orientations or organization of elements of the drawings may vary in embodiments.

In the context of the embodiments herein, e.g., for relational databases, a "data set" is stored as a "table" of data, and these terms, "tables" and "data sets" may be used interchangeably in the description.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for data visibility in nested transactions of distributed systems. Section III below describes example computing devices that may be used to implement features of the embodiments described herein. Section IV below describes additional examples and advantages, and Section V provides some concluding remarks.

II. Example Embodiments for Data Visibility in Nested Transactions of Distributed Systems Methods for data visibility in nested transactions of distributed systems are performed by systems and devices. Various embodiments herein are directed to database systems and computing centers, which may be cloud-based, such as but not limited to, data warehouses, systems for "Big Data" analytics, enterprise systems, other database systems that store very large data sets, and/or the like, and while some embodiments are described in the context of data warehouse implementations, embodiments are not so limited. Described embodiments are applicable to any type of database server implementation, such as but not limited to, SQL Server® from Microsoft Corporation of Redmond, WA. Additionally, embodiments are described for data visibility in nested transactions of distributed systems are enabled for use in snapshot isolation versioning and other versioning models contemplated herein, such as but not limited to, RCSI (read committed isolation level) versioning, and/or the like.

Distributed executions of queries are performed in a processing system according to an isolation level protocol for data management and data versioning across one or more data sets, one or more compute pools, etc., within a logical server via a single transaction manager that oversees the isolation semantics and data versioning. A distributed query processor performs nested transaction versioning for distributed tasks of transactions/queries that modify, delete, or write data (i.e., data modification transactions) to be performed by distributed compute nodes by generating nested transaction identifiers, encoded in data rows, which are used to enforce correct data visibility, including for data rows and metadata. Data visibility is restricted to previously committed data from distributed transactions and tasks and is blocked for distributed transactions and tasks that run concurrently thus providing built-in Halloween protection for transactions and tasks. Local commits for completed transactions and tasks are used to minimize transaction manager interactions, and instant rollbacks are enabled for aborted transactions and tasks to allow nested-level retries. The nested transaction versioning described is also enabled under isolation level protocols governed by a transaction manager.

In embodiments, a data warehouse system may comprise multiple compute pools within a logical server. A compute pool may include, without limitation, a control node (i.e., a front end node), a distributed query processor (DQP), one or more compute nodes, and/or the like. Control nodes and associated DQPs may act as query endpoints that are responsible for producing a distributed plan for an incoming query and dividing work among a pool of compute nodes, where each compute node may responsible for distributively processing data from one or more distributions, i.e., portions or distributions of a data set, of a large distributed table. Each control and compute node in the embodiments described may be configured to run/execute its own instance of a database server, each of which may be assigned a resource manager identifier unique to the data warehouse system. In embodiments, an instance of database server may comprise a portion of a node(s), a node, more than one node, etc. Additionally, DQPs are enabled to generate directed acyclic graphs (DAGs) associated with query plans, for distributed processing of transactions/tasks at the compute nodes, and associated nested transaction identifiers In embodiments, compute pools may share the same transaction manager node to start or finally commit a transaction, and may share a DQP that is configured to manage nested transaction identifiers. Additionally, queries are contemplated to be directed against a single, or multiple, databases (DB s), which may include writing across all databases within a logical server that comprise the same transaction manager node. That is, cross-DB query support is implicit in the described embodiments according to the versioning semantics.

Data maintained in a table of a database is versioned such that multiple queries can be executed on specific data versions without data alterations affecting executing queries, as described in further detail herein. As noted above, embodiments may be described with respect to different top-level isolation versioning, e.g., snapshot isolation, with nested transaction versioning identifiers, hierarchically under top-level version identifiers, for distributed transactions/tasks. This versioning implementation allows for encoding full, hierarchical identifiers in data rows that are used to enforce data visibility, provide for instant rollbacks, enable local commits of modified data in nested tasks/transactions without transaction manager communications, etc., as described herein.

Examples described for data visibility in nested transactions of distributed systems enable robust and efficient handling of any number of nested transactions under a root-level or ultimate parent identifier generated by a transaction manager that governs base isolation versioning. Any transaction started by a user or back end process will have its lifetime associated with the session on front end node or compute node, and when this root transaction is committed or aborted on the front end/compute node, the transaction ends. In embodiments, the compute node communications with the remote transaction manager service only to abort nested transaction, while the rest of the management of nested transactions and versioning is implicitly encoded in the nested identifier scheme via visibility rules and nesting levels. A nested transaction, as described herein, is a child-level transaction in a transaction hierarchy where each nested level has a parent level, and the root level of the hierarchy is a user or backend transaction (e.g., that is provided to the front end/compute node). Embodiments provide for visibility rules for child, sibling, parallel siblings, and/or parent transactions, as well aborted transaction data that govern which data associated with other transactions/tasks in the hierarchy can be seen by a given transaction/task and improves query reliability at each processing layer of the system. For instance, a task or group of tasks, or an entire statement may fail, but the overall transaction may still succeed by aborting a failed, nested transaction level, making the work performed to that point invisible, and retrying the nested transaction with new identifiers. Additionally, the nested transaction identifier embodiments herein provide for Halloween protection where concurrent tasks are identified as parallel nested transactions and do not have visibility to each other's data. In one example, the DQP of a system includes multiple vertices/task groups in a DAG as part of same nested transaction based on the visibility rules described herein. Any implementation of nested transaction levels or concurrency at each level is supported by embodiments, where any transactions/tasks may be serially executed or concurrently executed, and the visibility for data may be defined by the scope of given level/node in the tree of transaction hierarchy. For instance, parallel transactions/tasks, i.e., siblings, are not permitted to see the work of other concurrent siblings, based on the nested identifier semantics utilized herein, and overall processing performance is improved in the system while adhering to the visibility rules for correctness as each data row includes all levels of identifiers encoded there, as described in further detail below.

As an example, consider a scenario for snapshot isolation that utilizes the data visibility in nested transactions described herein in which a user transaction against data in a table is received and started on a control node of the system, e.g., a front end node that receives a user query. The control node communicates with a transaction manager node that returns a token associated with each query. The tokens include, without limitation, a transaction start identifier, or a root identifier, of the query generated by the transaction manager (e.g., a transaction version, for instance "10"), a query identifier, an active queries/transactions list, a partial abort list of recently aborted queries, a point-in-time, and/or the like. The user transaction is thus initiated, and the control node begins a statement-level transaction, of one or more statement-level transactions, nested within the user transaction. In embodiments, statement-level transactions may be performed sequentially with respect to each other. In this example, a statement-level identifier of a first statement-level transaction may be generated by the compute node, e.g., "1," where the statement-level identifier is associated with the root-level identifier "10" as "10.1" or the like.

The token and statement-level identifier are passed down to the DQP with transactions/tasks to be performed by compute nodes (e.g., backend nodes doing work on behalf of the overall transaction). The DQP generates a DAG based on the transactions/tasks to be performed by the compute nodes, and also generates nested identifiers associated with the vertices of the DAG, e.g., task groups, and with tasks therein. In the above example, where the statement-level identifier "1" is associated with the root-level identifier "10" as "10.1," a first vertex of a DAG may have a vertex-level (or DQP-level) identifier of "1" generated by the DQP and associated with the root- and statement-level identifiers as "10.1.1" or the like, and a second vertex of the DAG may have a vertex-level (or DQP-level) identifier of "2" generated by the DQP and associated with the root- and statement-level identifiers as "10.1.2" or the like, and so on. It should be noted that the vertices in the example above are described as being sequentially processed. In some instances, the second vertex may be designated in the DAG by the DQP as being performed in parallel with a third vertex. In such cases, both the second and the third vertices of the DAG may have the same vertex-level (or DQP-level) nested identifier of "2" generated by the DQP and associated with the root- and statement-level identifiers as "10.1.2" or the like. In this way, concurrently processed transactions/tasks may be blocked from having visibility to each other's modified data. Continuing, a fourth vertex of the DAG that depends on completion of the second and third vertices (i.e., is performed sequentially after the second and third vertices) may have a vertex-level (or DQP-level) nested identifier of "3" generated by the DQP and associated with the root- and statement-level identifiers as "10.1.3" or the like, and so on.

As noted above, a vertex of a DAG may comprise a task group of transactions/tasks that are leaves of the hierarchical structures described herein and that are distributively processed compute nodes in a compute pool. Such transactions/tasks are "flat" but lack the durability of non-nested flat transactions. In furtherance of the prior example, each task in a task group assigned/distributed to a respective compute node is associated with a task-level nested identifier. For instance, given a number "n" compute nodes to which tasks are assigned, a number "n" of task-level nested identifiers are generated by the DQP for sequentially-processed vertices, and a number "nm" ("n" multiplied by "m") of task-level nested identifiers are generated by the DQP for concurrently-processed vertices, where "m" is the number of vertices processed concurrently. In the example above, where n=100, the distributed, nested tasks of the first vertex have generated task-level nested identifiers of "1" to "100" which are associated with the first vertex-level nested identifier (with full hierarchy) of "1" as "10.1.1.1," "10.1.1.2," . . . , "10.1.1.100," or the like.

For concurrently-processed vertices in a DAG, as noted above in the case of the second and third vertices, both having the same vertex-level (or DQP-level) nested identifier of "2" generated by the DQP and associated with the root- and statement-level identifiers as "10.1.2," nested tasks of the second and third vertices have generated task-level nested identifiers of "1" to "200" which are associated with the shared vertex-level nested identifier (with full hierarchy) of "2" as "10.1.2.1," "10.1.2.2," . . . , "10.1.2.200," or the like. In this way, parent-child dependencies for data and transactions/tasks in the hierarchy of nesting are determinable and comparable via a unique generation and assignment for all nested transactions by the DQP at the DAG and leaf task levels.

In embodiments, transactions/tasks may move data/files without blocking user queries, as data/files follow version chains according to the isolation protocol and the visibility rules predicated on the nested versioning semantics. Hence, most of the work done in the system is versioned, so no scan/read query is blocked behind any operation while maintaining support for the implemented isolation/nesting versioning. Additionally, it contemplated herein that back-end system transactions, in addition to or lieu of user transactions, may be performed by systems according the embodiments herein.

Embodiments herein provide for nested transaction identification based on a monotonically increasing counter for each level in the hierarchy with respect to parent nodes. In cases where a transaction/task is aborted, a retry may be performed where the retry identifier is the next counter value (e.g., a task-level retry in the first vertex for a task of "10.1.1.1," "10.1.1.2," . . . , or "10.1.1.100" would have a generated task-level nested identifier of ""10.1.1.101, and a vertex-level retry of the first vertex would have nested identifiers of "10.1.J.1," "10.1.J.2,", or "10.1.J.100" where J is the next vertex-level nested identifier." Each control/compute node and the DQP in the system may keep local caches of aborted transactions which are synchronized with the transaction manager at each query bolstering correct data visibility. The transaction manager node is configured to maintain local caches to quickly service requests from the control node and the compute nodes and avoid data flow bottlenecks. Successfully completed transactions/tasks in the hierarchy are locally committed in embodiments, enabling instant rollback and retries, where a final, global commit is performed at the root level on successful completion of the user transaction and all its child transactions/tasks.

Embodiments herein enable a data warehouse system to provide correct data visibility in nested transactions of distributed systems, including snapshot level consistency for data versions, to all user transactions and support cross database and cross-compute pool transactions. Further, systems that utilize the described embodiments reduce operational complexity, reduce intra-system communications, and provide immediate and reliable rollbacks of data. For instance, through versioning semantics, the embodiments herein enable lock-free scans for read-only queries, instant data rollback across the distributed system responsive to aborts, retries of failed/aborted transactions and tasks at nested levels, and local commits for modified data without transaction manager communications. The described embodiments also enable queries across multiple databases within a same logical server and/or across compute pools in the same logical server, using the same nesting versioning semantics and methodology.

Accordingly, the embodiments herein provide for solutions to issues with data versioning in databases through unique nested versioning semantics. These and other embodiments will be described in further detail below in this Section, in association with the Figures, and in Sections/Subsections that follow.

Systems, devices, and apparatuses herein may be configured in various ways for data visibility in nested transactions of distributed systems, such as data warehouses that maintain large databases. For instance, FIG. 1 will now be described. FIG. 1 shows a block diagram of a system 100 that is configured for data visibility in nested transactions of distributed systems, according to example embodiments.

As shown in FIG. 1, system 100 includes a user device 102 and a data warehouse 104. In embodiments, user device 102 and data warehouse 104 communicate with each other over a network 112. It should be noted that in various embodiments different numbers of user devices and/or data warehouses, and/or subcomponents thereof, are present.

Additionally, according to embodiments, any combination of the systems and/or components illustrated in FIG. 1 are present in system 100.

Network 112 comprises different numbers and/or types of communication links that connect devices, platforms, and hosts/servers such as, but not limited to, the Internet, wired or wireless networks and portions thereof, point-to-point connections, local area networks, enterprise networks, cloud networks, and/or the like, in embodiments.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for interacting with a database, data warehouse, and/or database server, such as providing queries against tables/data sets. User device 102 also includes additional components (not shown for brevity and illustrative clarity) including, but not limited to, components and subcomponents of other devices and/or systems herein, in embodiments. In some embodiments, user device 102 may comprise a computing device/system hosting a service or application that provides queries against tables/data sets.

Data warehouse 104 comprises one or more server computers, computing systems, and/or computing devices, which may include one or more distributed or "cloud-based" servers in embodiments. Data warehouse 104 may comprise one or more on-premises servers in addition to, or in lieu of, cloud-based servers, in different implementations contemplated herein. Various systems/devices herein, such as data warehouse 104, are configured to provide services utilized by user device 102, such as business services and/or applications involving data warehousing, database hosting, and/or like. For instance, data warehouse 104 includes one or more compute pool(s) 108 that may each include, without limitation, a control node, a DQP, one or more compute nodes, and/or the like, as described herein each of which are configured to perform functions for data visibility in nested transactions of distributed systems. Data warehouse 104 also includes a transaction manager node 110 associated with compute pool(s) 108, configured to perform functions for data visibility in nested transactions of distributed systems, as described in further detail herein, and one or more data sets 106 ("data sets 106" hereinafter).

Data sets 106 include databases and/or the like, in embodiments, which may be very large data sets such as for "Big Data" analytics and/or data warehousing. It is contemplated herein that one or more of data sets 106 are to the order of petabytes, or more, in embodiments. Data sets 106 may include any type of data, including relational data, organized as tables having columns for the data that may be stored in rows.

As noted above, compute pool(s) 108 may include a control node that comprises one or more server computers, server systems, and/or computing devices, such as an on-premises server(s) in addition to, or in lieu of, cloud-based servers. A control node, or front end, may include an instance of a database server application and is configured to act as the query endpoint for incoming queries, to produce a distributed plan for an incoming query in conjunction with a DQP that utilizes the described nested transaction identifier semantics. In embodiments, a compute node and a DQP may be logically and/or physically separate, or combined in whole/part. The distributed query plan divides work for query processing among compute nodes of compute pool(s)

108. That is, according to embodiments, a control node and a DQP are configured to receive and transform an incoming query into a set of queries that are run against distributions of a data set, e.g., in parallel, via the compute nodes. The DQP is also configured to generate a DAG for corresponding transactions that utilized the described nested transaction identifier semantics, e.g., in rows of data and for transactions/tasks, that both improve performance of query operations and enforce data visibility rules for correctness of processing queries by the system.

Compute nodes may each comprise one or more server computers, server systems, and/or computing devices, such as an on-premises server(s) in addition to, or in lieu of, cloud-based servers. Compute nodes may also each include an instance of a database server application, and are configured to read and/or process data from one or more distributions of large tables in performance of query execution tasks as distributed by the control node/DQP. In embodiments herein, compute nodes 110 are configured to perform functions and/or operations in accordance with data visibility in nested transactions of distributed systems, including transactions based on isolation and/or nested versioning, local commits for modified data, nested-level retries of transactions/tasks, etc.

Transaction manager node 110 drives the versioning and semantics for isolation, e.g., snapshot isolation, RCSI, etc., under which the described data visibility in nested transactions of distributed systems is utilized in the described embodiments. For example, transaction manager node 110 is configured to version, or uniquely identify, incoming queries that alter or modify data (i.e., queries that are not read-only) and data that is altered/modified by such queries. This version or unique identifier may be the root-level identifier with respect to any nested transactions. Transaction manager node 110 is also configured to supervise and maintain active, commit, and abort information for such queries. These and additional details regarding transaction manager node 110 are described in further detail below.

As noted above, data warehouse 104 includes one or more distributed or "cloud-based" servers, in embodiments. That is, data warehouse 104 may be a network, or "cloud," implementation for applications and/or services associated with hosting databases and/or data warehousing in a network architecture/cloud platform. A cloud platform includes a networked set of computing resources, including servers, routers, etc., that are configurable, shareable, provide data security, and are accessible over a network such as the Internet, according to embodiments. Cloud applications/services for hosting databases and/or data warehousing are configured to run on these computing resources, often atop operating systems that run on the resources, for entities that access the applications/services, locally and/or over the network. A cloud platform is configured to support multi-tenancy as noted above, where cloud platform-based software services multiple tenants, with each tenant including one or more users who share common access to certain software services and applications of the cloud platform, as noted herein. Furthermore, a cloud platform is configured to support hypervisors implemented as hardware, software, and/or firmware that run virtual machines (emulated computer systems, including operating systems) for tenants. A hypervisor presents a virtual operating platform for tenants.

While a data warehouse (e.g., data warehouse 104) is shown in system 100 for non-limiting purposes of description and illustration, in various embodiments, alternate implementations for database hosting are also contemplated herein.

Figure 2:
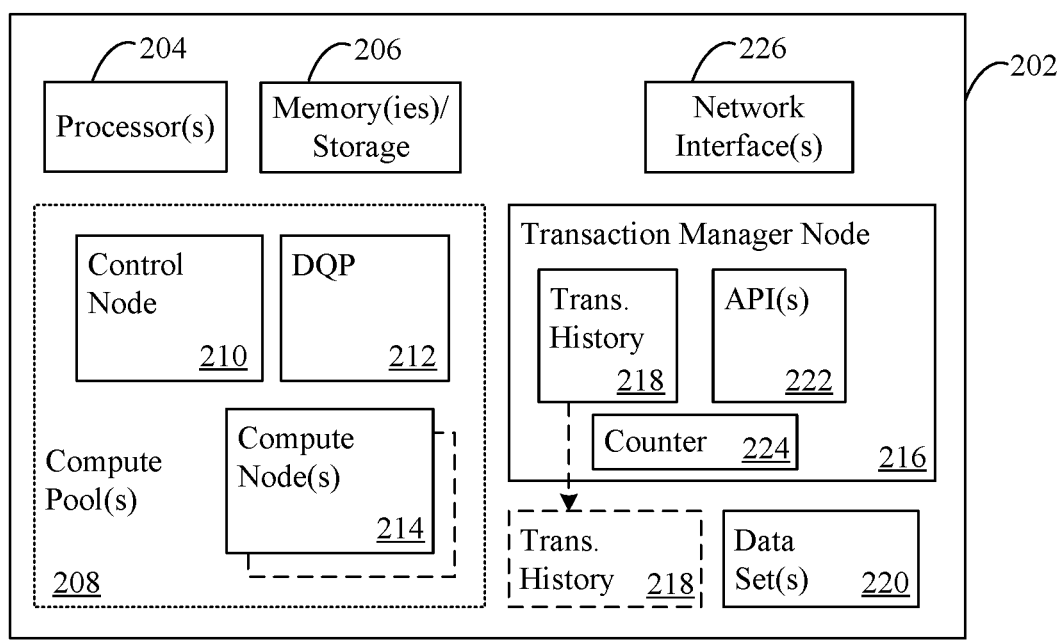
FIG. 2 shows a block diagram of a computing system for data visibility in nested transactions in distributed systems, according to an example embodiment.

Referring now to FIG. 2, a block diagram of a system 200 is shown for data visibility in nested transactions of distributed systems, according to an example embodiment. System 200 as exemplarily illustrated and described is configured to be an embodiment of data warehouse 104 of system 100 in FIG. 1. That is, system 200 is illustrated as being configured to perform operations of a data warehouse based on the techniques described herein. System 200 is described as follows.

System 200 includes a computing system 202 which is any type of server or computing system, as mentioned elsewhere herein, or as otherwise known, including without limitation cloud-based systems, on-premises servers, distributed network architectures, a data warehouse or portions thereof, and/or the like. As shown in FIG. 2, computing system 202 includes one or more processors ("processor") 204, one or more of a memory and/or other physical storage device ("memory") 206, as well as one or more network interfaces ("network interface") 226. Computing system 202 also includes a compute pool(s) 208 and a transaction manager node 216. Also illustrated for system 200 is data set(s) 220, which may be an embodiment of data set(s) 106 of FIG. 1.

Processor 204 and memory 206 may respectively be any type of processor circuit(s)/system(s) and memory that is described herein, and/or as would be understood by a person of skill in the relevant art(s) having the benefit of this disclosure. Processor 204 and memory 206 may each respectively comprise one or more processors or memories, different types of processors or memories (e.g., a cache(s), temporary database memory, etc., for versioning and/or query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of compute pool(s) 208, transaction manager node 216, including one or more of the components thereof as described herein, and/or the like, which may be implemented as computer program instructions, or alternative as hardware, as described herein.

Memory 206 includes volatile storage portions such as a random access memory (RAM) and/or persistent storage portions such as hard drives, non-volatile RAM, caches, and/or the like, to store or be configured to store computer program instructions/code for data visibility in nested transactions of distributed systems as described herein, as well as to store other information and data described in this disclosure including, without limitation, data sets, tables of information associated with queries, indexes, lists or tables of data version information, counter values, and/or the like, in different embodiments. For instance, computing system 202 also includes a transaction history 218 and data set(s) 220 which may be stored in memory 206, e.g., as on-disk storage. In embodiments, transaction history 218 and data set(s) 220 may be stored in a storage external to computing system 202, and may be available for sharing/use by computing system 202 and/or other systems (e.g., multiple pools of compute/processing nodes, as described herein, etc.) via a network or storage interface.

Network interface 226 may be any type or number of wired and/or wireless network adapter, modem, etc., configured to enable system 200, including computing system 202, to communicate intra-system with components thereof, as well as with other devices and/or systems over a network, such as communications between computing system 202 and other devices, systems, hosts, of system 100 in FIG. 1, including systems that store data sets, user devices, compute nodes, and/or the like, over a network such as network 112.

System 200 also includes additional components (not shown for brevity and illustrative clarity) including, but not limited to, components and subcomponents of other devices and/or systems herein, as well as those described below with respect to FIG. 10, according to embodiments.

Compute pool(s) 208 may be an embodiment of compute pool(s) 108 in FIG. 1, as described above. In the illustrated embodiment, compute pool(s) 208 includes a control node 210, a distributed query processor (DQP) 212, and one or more compute node(s) 214, although embodiments contemplate different numbers of one or more of these components in various implementations. Likewise, one or more of compute pool(s) 208 may be present computing system 202.

Control node 210 may comprise any database server application, in addition to processors and memory described above, and operate as a front end, or a query endpoint, in embodiments, that receives queries from user devices, services, applications, and/or the like. Control node 210 may include a data definition language (DDL) engine and a query optimizer, in embodiments. A DDL engine is configured to execute statements to create, modify, and delete tables, indexes, and relationships in a data set, e.g., based on an incoming query. In embodiments, a DDL engine is configured to execute statements to create, modify, and/or delete tables, lists, arrays, and/or other data structures that are generated in performance of the query transactions. A query optimizer is configured to generate query plans for execution of incoming queries against data sets based at least on the incoming queries and other information, e.g., cardinality estimates, etc. To begin query execution, control node 210 may communicate with transaction manager node 216 and provide information associated with a query (e.g., an API call responsive to receiving the query, as described below) such that transaction manager node 216 is enabled to assign a transaction start identifier (i.e., a begin sequence number that corresponds to a root-level identifier) for the query and to generate a token as further described herein.

DQP 212 may include subcomponents such as a deserializer, a Directed Acyclic Graph (DAG) generator, a workload manager, and/or the like in embodiments, and may be configured to orchestrate a query task DAG across large numbers, e.g., thousands, of compute nodes at petabyte-scale reliably. A deserializer is configured to deserialize requests for distributed query processing on data set distributions, received from control node 210, and to provide its output to the DAG generator which in turn is configured to generate a DAG, such as a static DAG that outlines process dependencies and operations for performing distributed execution of query tasks/transactions. DAGs are provided from the DAG generator to the workload manager which is configured to assign ones of compute node(s) 214 to perform the distributed query tasks/transactions in accordance with the embodiments herein for data visibility in nested transactions of distributed systems.

Control node 210 may be a logically or physically separate entity from other components of computing system 202, and DQP 212 may be a logically or physically separate entity from other components of computing system 202. For example, in some embodiments, control node 210 and DQP 212 may be implemented in different physical or logical server hosts that are communicably linked for performance of data visibility in nested transactions of distributed systems. In such embodiments, DQP 212 may comprise a separate server node while control node 210 comprises its own server.

Compute node(s) 214 may comprise any database server application, in addition to processors and memory described above, and operate as a back end, in embodiments, that receives portions of distributed query tasks/transactions from control node 210 and/or DQP 212. One or more compute node(s) 214 may be present in given embodiments, and each of compute node(s) 214 may include a data definition language (DDL) engine and a query optimizer, in embodiments, as described above. Compute node(s) 214 is configured to operate on specific versions of data, in accordance with data visibility in nested transactions of distributed systems, and are configured to perform local commits for modified data, nested-level retries of transactions/tasks, etc., as further described herein.

While not shown in FIG. 2 for illustrative clarity, control node 210 and each of compute node(s) 214 may include a local cache. Each local cache may include a list of aborted query transactions utilized to determine appropriate versions of data that are allowed to be visible to active queries/transactions.

Transaction manager node 216 may be an embodiment of transaction manager node 110 in FIG. 1, described above. Transaction manager node 216 is configured to drive the versioning and semantics for isolation protocols under which the data visibility in nested transactions of distributed systems is maintained, according to the described embodiments, including but not limited to, providing versions, or unique identifiers (e.g., root-level identifiers) to incoming queries that alter or modify data (i.e., queries that are not read-only, or data manipulation language (DML) operations) and data that is altered/modified by such queries, as well as supervising and maintaining active, commit, and abort information for such queries. Transaction manager node 216 is also configured to assign and to use versions for remote blobs, delta store rows, and DDL operations (i.e., for logical metadata), and/or the like. As illustrated, transaction manager node 216 includes one or more API(s) 222 ("APIs 222" hereinafter), one of which may be a BeginTransaction API to which a call may be made by control node 210, for a received query, in order to acquire a token comprising a unique transaction start identifier/root-level identifier of the query, a unique query identifier, an active queries/transactions list, and a partial abort list, as described herein. In embodiments, the transaction start/root identifier (ID) acts as a query begin sequence number, for queries that are not read-only, that temporally associates the received query with prior queries (i.e., sequentially with respect to time). The query ID (QID) for a query that modifies or alters data may be the same as its transaction start ID. It should be noted that read-only queries may be assigned a "NULL" transaction start ID as these queries are not tracked by transaction manager node 216, in embodiments, but read-only queries are assigned a QID. The transaction start IDs/root-level IDs and QIDs (in addition to commit and abort IDs described herein) for queries in the system are assigned by transaction manager node 216 based on a global versioning variable counter 224 ("global counter 224") that increments to maintain uniqueness for root identifiers of different queries/transactions according to snapshot isolation (or RCSI, in alternate embodiments), and thus uniqueness for nested identifiers thereunder. Global counter 224 may any type of incrementing counter, such as an integer counter, an unsigned integer counter, and/or the like, that may be of any length. Queries are thus enabled to filter out rows based on the isolation and nested versioning semantics described herein. The novel format of nesting versioning described herein allows an architecture based on embodiments to share versioning across databases, compute pools, data warehouses, etc., to support multiple Read/Write databases, concurrency with Halloween protection, instant rollbacks for aborts/retries, etc.

Transaction manager node 216, control node 210, and DQP 212 enable transaction and data visibility to be implicit via the versioning semantics used for reads performed in query transactions to verify the correct data versions are read and to block data visibility that is not allowed by the visibility rules. To further enable support of a common version store at a root transaction level, transaction manager node 216 is configured to write versioning information to transaction logs, in transaction history 218, which may include commit or abort history information, and which may be on-disk information in embodiments. Additionally, APIs 218 may support transactions in the overall system and may be implemented to access the information maintained by transaction manager node 216 in a cache thereof and/or in transaction history 218. For example, APIs 222 may also include APIs to commit transactions, abort transactions, get a transaction state, get a list of queries with a specified type, and/or the like. That is, transaction manager node 216 is configured and enabled to be contacted by control nodes, DQPs, and compute nodes in a data warehouse to allow access to real-time, or near real-time, changes to transaction status and data happening in the system. Accordingly, there is little if any delay in the distributed systems herein for supporting nested version semantics of data visibility in nested transactions. Control node 210 and DQP 212 further enable support of nested versioning at child, or sub-transaction, levels for nested transactions as described herein.

It is also contemplated herein that one or more of control node 210, DQP 212, and/or compute node(s) 214 may include an API(s) similar or equivalent to APIs 222 in order to access/receive information of transaction manager node 216, as well as to perform operations such as global commits, aborts, and/or the like. That is, calls to APIs 222 described herein are not limiting and embodiments include alternate calls from other APIs of components in system 200 that perform the same, or substantially the same, operations. In embodiments, local commits may be performed according to one of APIs 222 or by control node 210, DQP 212, and/or compute node(s) 214.

While not shown in FIG. 2 for illustrative clarity, transaction manager node 216 may include one or more local caches, which may be globally-unique and/or accessible, in the system.

Figure 3:
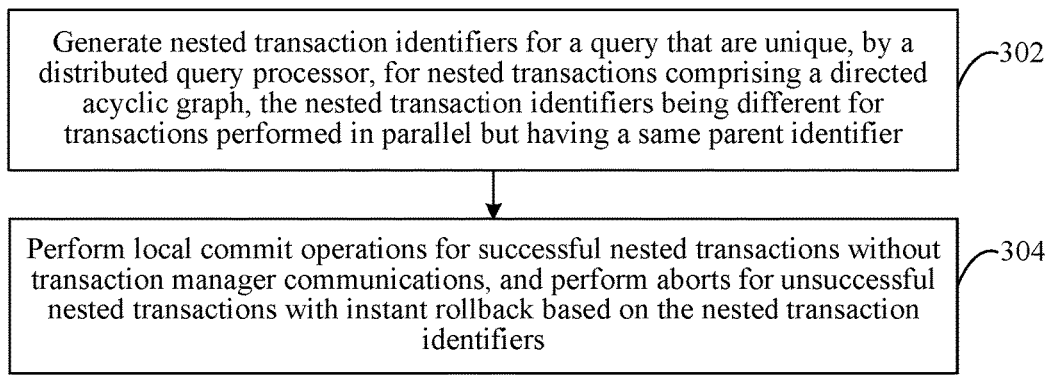
FIG. 3 shows a flowchart of a computing system for data visibility in nested transactions in distributed systems, in accordance with an example embodiment.
Figure 4:
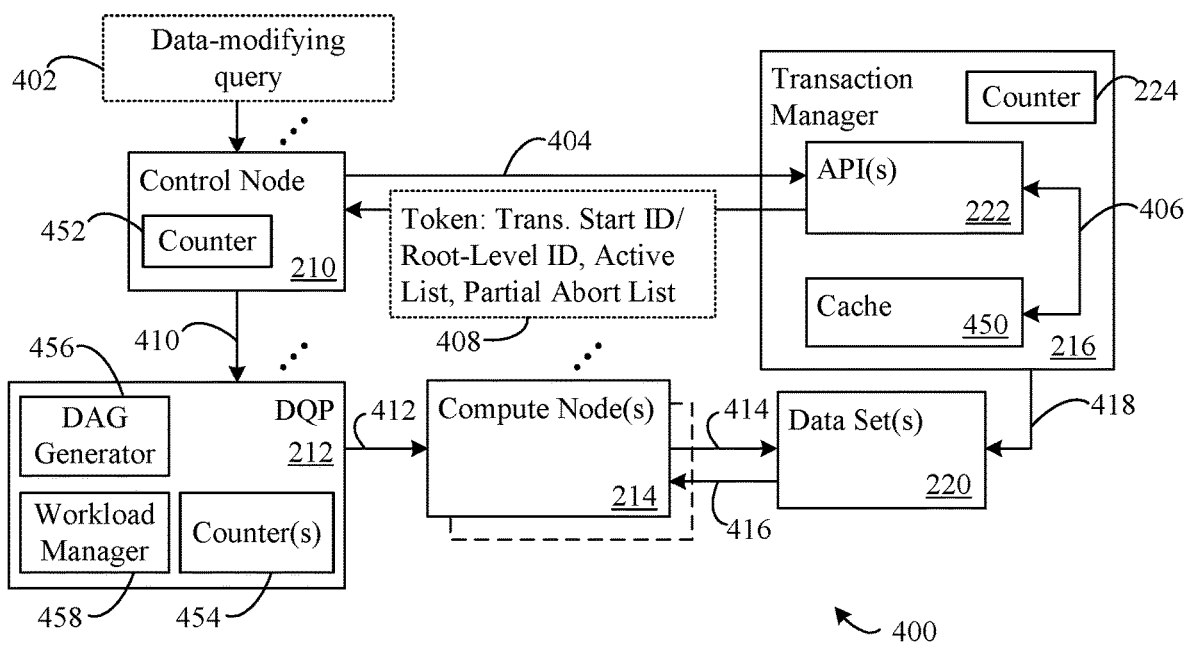
FIG. 4 shows a flow diagram for data visibility in nested transactions in distributed systems, in accordance with an example embodiment.
Figure 5:
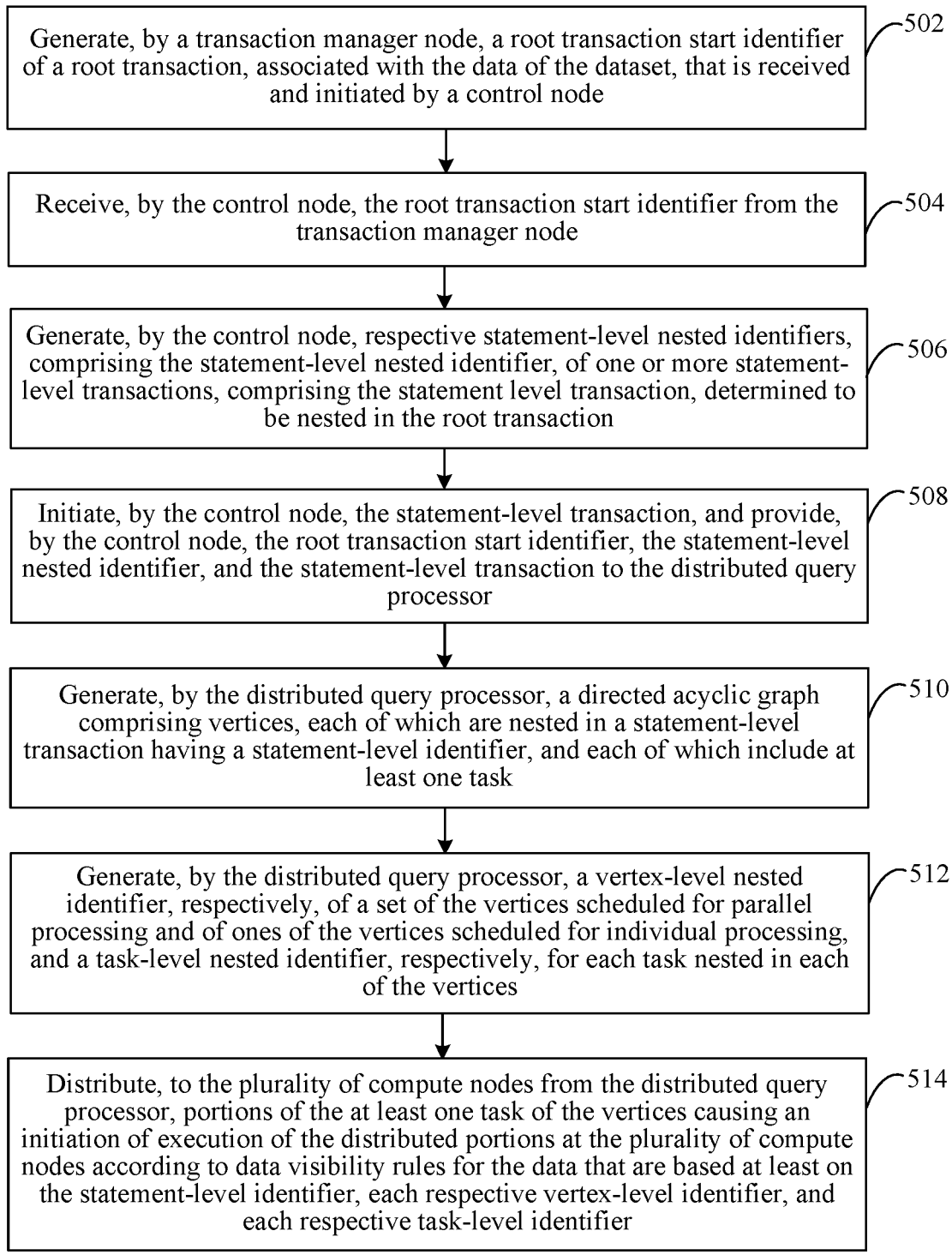
FIG. 5 shows a flowchart for data visibility in nested transactions in distributed systems, in accordance with an example embodiment.

FIG. 3, FIG. 4, and FIG. 5, each of which are for data visibility in nested transactions in distributed systems, will now be described with reference to each other.

FIG. 3 shows a flowchart 300 for data visibility in nested transactions in distributed systems, in accordance with an example embodiment. Further structural and operational examples will be apparent to persons skilled in the relevant art(s) based on the following descriptions. Flowchart 300 is described as follows with respect to system 200 of FIG. 2.

Flowchart 300 begins at step 302. In step 302, nested transaction identifiers for a query that are unique are generated, by a distributed query processor, for nested transactions comprising a directed acyclic graph, the nested transaction identifiers being different for transactions performed in parallel but having a same parent identifier. For instance, as described above, computing system 202 of system 200 in FIG. 2 is enabled and configured to generate nested transaction identifiers for a query that are unique, by a distributed query processor such as DQP 212, for nested transactions comprising a directed acyclic graph, the nested transaction identifiers being different for transactions performed in parallel but having a same parent identifier.

In step 304, local commit operations are performed for successful nested transactions without transaction manager communications, and aborts are performed for unsuccessful nested transactions with instant rollback based on the nested transaction identifiers. For example, as described above, computing system 202 of system 200 in FIG. 2 is enabled and configured to perform local commit operations for successful nested transactions without transaction manager communications, and to perform aborts for unsuccessful nested transactions with instant rollback based on the nested transaction identifiers, e.g., by control node 210, DQP 212, and/or compute node(s) 214.

The management of multi-level nested identifier space via the control node/front end and DQP, according to embodiments herein, the enforcement of visibility rules for data and transactions (including Halloween protection), and encoding of sequential and parallel nested transactions embedded in the nested transaction identity space enable performance gains in query processing, including increased processing efficiency for compute pools, reduced memory footprint, and reduced communication overhead, provides improved query accuracy, and reduces processing burden on transaction manager nodes that may be shared across multiple compute pools. For instance, the data visibility rules for nested transactions in distributed systems described herein enable minimal transaction manager node involvement via the encoding of nested hierarchy identity information in a data column of stored rows of data that is used to determine data visibility instantly for a given nested transaction/task with minimal transaction manager dependency—e.g., only abort list dependency associated with the transaction manager node is required for aborted tasks/transactions, and increased query reliability and completion is enabled by task level abort/retry handling where a user/backend system transaction query does not suffer transient errors. Further details regarding such the performance of steps in flowchart 300 are provided below.

Figure 6:
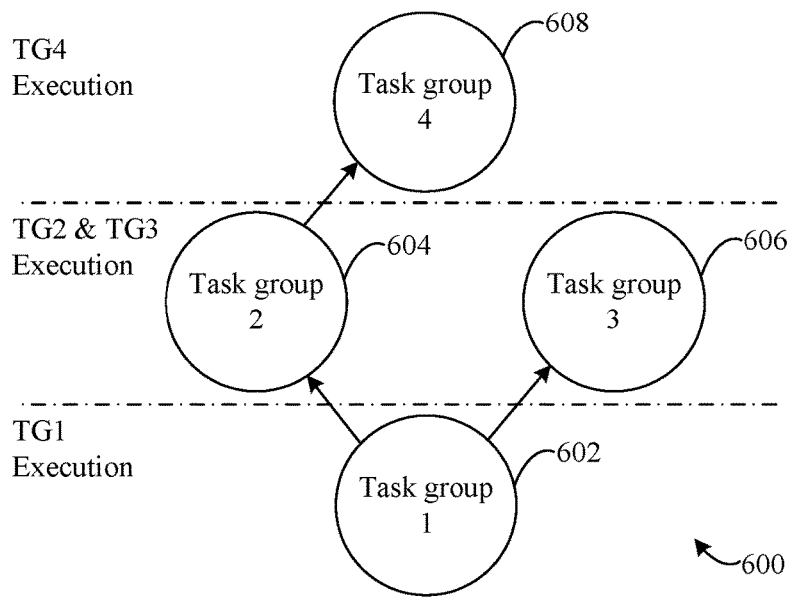
FIG. 6 shows a flow diagram of a directed acyclic graph for data visibility in nested transactions in distributed systems, in accordance with an example embodiment.

FIG. 4, FIG. 5, and FIG. 6, each of which are for data visibility in nested transactions in distributed systems, will now be described with reference to each other. FIG. 4 shows a flow diagram 400, according to an example embodiment, with respect to system 200 of FIG. 2. FIG. 5 shows a flowchart 500, according to an example embodiment, and FIG. 6 shows a flow diagram for a DAG 600, according to an example embodiment. Flowchart 600 is described below, also with respect to system 200 of FIG. 2. Further structural and operational examples will be apparent to persons skilled in the relevant art(s) based on the following descriptions.

Turning now to FIG. 4, flow diagram 400 begins where a query 402 against one or more databases is received by control node 210, e.g., from user device 102 in FIG. 1 or a backend system transaction, acting as a front end for the distributed query system. The query may be a query that modifies or alters data in the database(s)/data set(s), e.g., data set(s) 220. In embodiments, multiple compute pools comprising groups that include ones of control node 210, DQP 212, and compute node(s) 214 may be utilized during execution of query 402, as noted herein and as illustrated in FIG. 4 via the ' . . . ' for these components. Control node 210, responsive to receiving query 402, is configured to issue an API call 404 to one of APIs 222 of transaction manager node 216. In embodiments, API call 404 is a BeginTransaction call for which a token is requested based for new query 402. To generate the token, API call 404 is handled by transaction manager node 216, including an access 406 to a cache 450 of transaction manager node 216, which may be a master cache for the system, and which may be updated with a next value of global counter 224 as the transaction start ID/root-level ID. In embodiments, global counter 224 corresponds to bits of a system variable, e.g., the bits of a 64-bit unsigned integer. Cache 450 may include a commit table, an abort index, a point-in-time (PIT) index associated therewith, and/or the like. The commit table may include rows, and each received query that modifies/alters data may have its own row. That is, each query received by control node 210, that is not a read-only query, may have a row in the commit table appended on its completion. Each of these rows may include, but is not limited to, a transaction start ID that may also be a root-level identifier in the embodiments herein, a transaction end ID (which may be for a commit or an abort), a query transaction of the corresponding query (e.g., begin, commit, abort, etc.), an oldest active ID for the oldest transaction in the system, a PIT value for point-in-time queries, a resource manager ID specifying a compute pool or database server instance that will run the query, and/or the like. The abort index may also include rows, and each query that is recently aborted may have a row in this index until the row is provided to a compute pool via a token as a partial abort list. Rows of the abort index include, but are not limited to, a unique transaction abort ID and the transaction start ID of the aborted query. The PIT index may also include rows, and each query that is directed to data of a prior point-in-time may have a row in this index to track such queries. Rows of the PIT index include, but are not limited to, a PIT value and the transaction start ID of the corresponding query. Cache 450 may also comprise an abort cache that maintains a sequential list, as rows, of each aborted query in the system, where each row may include, without limitation, a transaction abort ID and the transaction start ID of the corresponding query. It should be noted that the abort index may only store recently aborted queries to facilitate quick responses therefor, e.g., for tokens or other API calls, in view of the versioning semantics described herein, while the abort cache maintains a complete, system-wide abort list. Instances of the abort cache may also be included in transaction manager node 216, in control node 210, in DQP 212, and/or in each of compute node(s) 214. Cache 450 may also include one or more instances of an active cache. The active cache may maintain a sequential list, as rows, of each active transaction/query in the system at a root level, where each row may include the same or similar entries as for the commit table described above, such as but without limitation, the transaction start ID or root-level ID, the transaction end ID (which may for a Commit or an Abort), the query transaction of the corresponding query (e.g., begin, commit, abort, etc.), the oldest active ID for the oldest transaction in the system, the PIT value for point-in-time queries, the resource manager ID specifying a compute pool or database server instance that will nut the query, and/or the like, but for transactions that modify or alter data, and that are currently active in the system. It should be noted that the active index is configured to store currently active queries/transactions to facilitate quick responses therefor, e.g., for tokens or other API calls, in view of the versioning semantics, thus maintaining a complete, system-wide active transaction list.

In fulfillment of API call 404, access 406 may include populating a new row of the commit table for the query 402 with relevant information when the query is to modify or alter data, as described above. Thus, access 406 to cache 450 may return a transaction start ID/root-level ID, a query ID, an active transaction list based on queries having an "active" transaction state, and a partial abort list of recently aborted queries as listed in the abort index to generate a token 408 that is provided as the return of API call 404. In embodiments, for a PIT query, the assigned PIT value as populated in the PIT index may also be returned.

Referring also now to FIG. 5 and flowchart 500, this flowchart begins in step 502. In step 502, a root transaction start identifier of a root transaction, associated with the data of the dataset, received and initiated by a control node is generated by a transaction manager node. For instance, as similarly described above with respect to FIG. 4, transaction manager node 216 is configured to generate a token that includes the root-level ID, e.g., token 408, responsive to query 402 being received and an associated request from control node 210. In embodiments, an API call for beginning a transaction may be utilized to cause transaction manager node 216 to generate the token having a valid sequential transaction start ID/root-level ID for queries that are not read-only, according to embodiments.

In step 504 of flowchart 500, the root transaction start identifier is received by the control node from the transaction manager node. For example, as similarly described above with respect to FIG. 4, transaction manager node 216 is configured to provide the token, e.g., token 408, that includes the root-level ID to control node 210 responsive to query 402 being received and in fulfillment of the API call.

In step 506 of flowchart 500, respective statement-level nested identifiers, comprising a statement-level nested identifier, of one or more statement-level transactions, comprising a statement level transaction, determined to be nested in the root transaction are generated by the control node. For instance, control node 210 is configured to determine that the root transaction, or user-level transaction, comprising query 402 in FIG. 4 includes one or more nested statement level transactions therein. For each of the statement level transactions, which control node 210 is configured to initialize, control node 210 generates a unique statement-level nested identifier. In embodiments, the statement-level nested identifiers are generated based on a counter 452 of control node 210 as illustrated in FIG. 4 which may any type of incrementing counter, such as an integer counter, an unsigned integer counter, and/or the like, that may be of any length. In embodiments, counter 452 corresponds to a set of bits of a variable, e.g., a first 32 bits of a 64-bit unsigned integer. Coupled with the value from global counter 224, the root-level ID and the statement-level ID for a given first-level nested transaction, uniquely identify that particular statement, e.g., (RootID [63:0]), (StatementID[63:32]), as the statement-level ID is increased by counter 452 for each statement nested in the root-level.

In step 508 of flowchart 500, the statement-level transaction is initiated by the control node, and the root transaction start identifier, the statement-level nested identifier, and the statement-level transaction are provided by the control node to the distributed query processor. For example, control node 210 is configured to initiate statement-level transactions, and to provide such transactions along with their corresponding nested statement-level IDs and token (e.g., token 408 that includes the root-level ID), to DQP 212 for distributed processing thereof, as shown in step 410 of flow diagram 400 in FIG. 4.

Referring back to FIG. 4 and flow diagram 400, DQP 212 is configured to orchestrate a query task DAG across large numbers, e.g., thousands, of compute nodes at petabyte-scale reliably and is configured to provide implicit fault-tolerance guarantees. DQP 212 is configured to utilize a DAG generator 456 to generate a DAG, such as a static DAG that outlines process dependencies and operations, for performing distributed task portions of statement-level transactions received from control node 210, as described above. DAGs are provided from DAG generator 456 to a workload manager 458 which is configured to assign ones of compute node(s) 214 to perform the distributed tasks in step 412. Counter(s) 454 may be similarly configured as counter 452, where counter(s) 454 are utilized to generate vertex-level IDs and task-level IDs respectively for the generated DAG and associated distributed tasks for each DAG vertex. The vertex-level IDs and task-level IDs are also provided respectively to the assigned ones of compute node(s) 214 in step 412.

Referring again to FIG. 5 and flowchart 500, in step 510, a directed acyclic graph comprising vertices, each of which are nested in a statement-level transaction having the statement-level identifier, and each of which include at least one task, are generated by the distributed query processor, for parallel nested processing. For instance, as noted above, DAG generator 458 of DQP 212 illustrated in FIG. 4 is configured to generator a DAG based on the statement-level transaction. The DAG includes vertices that are nested in the statement-level transaction and include task groups, of the distributed tasks for the statement-level transaction, having processing order dependencies.

Referring also now to FIG. 6, this flow diagram illustrates example DAG 600 that may be generated by DAG generator 456 in step 510 of flowchart 500. DAG 600 exemplarily includes four vertices, each of which represents and/or comprises a task group (also "TG" herein) of distributed tasks nested in parallel under a statement-level transaction, as described herein. As shown, DAG 600 includes a first vertex 602 for a task group 1, a second vertex 604 for a task group 2, a third vertex 606 for a task group 3, a fourth vertex 608 for a task group 4. As illustrated, task group 1 of vertex 602 will execute first at compute node(s) 214. Task group 2 of vertex 604 and task group 3 of vertex 606 will execute in parallel after task group 1 of vertex 602 completes, based on their DAG dependency with respect to task group 1 of vertex 602, and are allowed visibility of data for task group 1 of vertex 602, but not for each other. Similarly, task group 4 of vertex 608 will execute after task group 2 of vertex 604 and task group 3 of vertex 606 complete, and is allowed visibility of data for task group 1 of vertex 602, task group 2 of vertex 604, and task group 3 of vertex 606.

Turning again to FIG. 4, FIG. 5, and flowchart 500, in step 512, a vertex-level nested identifier is generated by the distributed query processor, respectively, of a set of the vertices scheduled for parallel processing and of ones of the vertices scheduled for individual processing, and a task-level nested identifier, respectively, for each task nested in each of the vertices. For instance, DQP 212 shown in FIG. 4, having generated the DAG in step 510, is configured to generate vertex-level nested IDs and task-level nested IDs for each vertex in the DAG, e.g., as exemplarily described for DAG 600, and for tasks of the task groups in each of the vertices. DQP 212 may generate the vertex-level nested IDs and task-level nested IDs based on counter(s) 454. As noted above, counter(s) 454 may be similarly configured as counter 452, where counter(s) 454 are utilized to generate vertex-level IDs and task-level IDs respectively for the generated DAG and associated distributed tasks for each DAG vertex. That is, counter(s) 454 may any type of incrementing counter, such as an integer counter, an unsigned integer counter, and/or the like, that may be of any length. In embodiments, counter(s) 454 may correspond to other sets of bits of the variable associated with counter 452, e.g., a middle 16 bits of the 64-bit unsigned integer for vertex-level nested IDs and a last 16 bits of the 64-bit unsigned integer for task-level nested IDs. Coupled with the value from global counter 224 and the first 32 bits of the variable for statement-level nested IDs, the root-level ID, the statement-level ID, the vertex-level ID, and task-level ID for given third-level nested transactions and given fourth-level nested tasks/transactions, uniquely identify particular vertices/task groups and tasks, e.g., (RootID [63:0]), (StatementID[63:32], VertexID[31:16], TaskID[15:0]), as the vertex-level ID and task-level ID are respectively increased by counter(s) 454 for each vertex nested in a given statement and for each parallel nested task in a given vertex.

Referring also to FIG. 6 and the flow diagram of DAG 600, because task group 2 of vertex 604 and task group 3 of vertex 606 will execute in parallel after task group 1 of vertex 602 completes, the same vertex-level nested ID will be assigned for both task group 2 of vertex 604 and task group 3 of vertex 606. This insures Halloween protection for the nested parallel tasks in these task groups in that the nested parallel tasks will be blocked from data visibility of each other's data as they share the same vertex-level nested ID.

In embodiments, DQP- or vertex-level nesting is not required to enable the ability to restart or retry transactions/tasks, although various embodiments are so enabled. In other words, an individual vertex that fails (e.g., through a fatal error) and is to be aborted need not be recorded in the transaction manager node, according to some embodiments. Instead, nested, parallel task failures from any vertex in a DAG may cause a retry of an entire statement after the previous statement-level ID (at the second level of the hierarchy) is recorded at the transaction manager node as aborted. The vertex-level IDs are provided, in embodiments, to enable support for DAG-/vertex-level visibility semantics and grouping of parallel, nested transactions (as described herein). Hence, the DQP is configured to start the vertex-level transactions using sequential vertex-level nested IDs within a given statement. Because the DQP is thus enabled, and communications to the transaction manager node, except for aborts, are not required at vertex- and task-levels, the DQP handles the nested IDs therefore internally via counter(s) 454 per DAG and assigns the nested IDs to vertices and nested, parallel tasks in respective task groups based on the data visibility semantics known only to DQP for the vertex-level. And as noted herein, an abort protocol for vertex-level transactions may be omitted, in embodiments, as an entire statement may be aborted rather than an individual vertex at the transaction manager node, thus simplifying the operations and processing of the system. In other embodiments, however, vertex-level transaction aborts/retries are contemplated by provided abort communications for recording at the transaction manager node, as similarly described for other hierarchy levels. Additionally, individual task-level aborts and retries are likewise supported by the embodiments herein.

In flowchart 500 of FIG. 5, in step 514, portions of the at least one task of the vertices are distributed to the plurality of compute nodes from the distributed query processor causing an initiation of execution of the distributed portions at the plurality of compute nodes according to data visibility rules for the data that are based at least on the statement-level identifier, each respective vertex-level identifier, and each respective task-level identifier. For example, as noted above, DQP 212 is configured to generate distributed tasks 412 for query 402 in FIG. 4, each of which may be respectively provided to ones of compute node(s) 214 for processing, based on determinations by workload manager 458, with token 408, the statement-level ID, the vertex-level IDs, and each of the task-level IDs, for each of the distributed tasks so that each of compute node(s) 214 is enabled to determine and operate on the correct, visible version of data in the queried database(s) to which query 402 is directed against for the parallel nested tasks in each task group. The provided nested versioning IDs/information are utilized by compute node(s) 214, based on an access 414 to data versions in rows of data set(s) 220, to determine the proper, visible version(s) 416 of the data in the database and/or locally committed data, in embodiments, for each row of data having a version number encoded therein, via a comparison of listed data versions and nested IDs of the tasks.

In embodiments, nested tasks in vertices at the fourth level of the hierarchy are started in parallel, as noted here, and this initiation is performed by DQP 212 thus obviating round trip communications with transaction manager node 216. That is, the use of counter(s) 454, e.g., for sequential monotonically increasing IDs for vertex-level identifiers, enables the management of IDs and process initiation at DQP 212 for DAG vertices at the vertex level, and also for fourth level nested, parallel tasks (i.e., task-level IDs). Nested, parallel tasks/transactions at the fourth level are not lazily marked to an aborted state by a background heartbeat/abort protocol, in embodiments—rather, because DQP 212 relies on an up-to-date abort state to enable initiation of retries for nested, parallel tasks (i.e., DQP 212 may retry only after making sure a task is aborted), aborts may be driven by DQP 212 itself, according to embodiments. Therefore, DQP 212 is configured to assign sequential task-level IDs for fourth-level nested, parallel tasks, per vertex in the DAG. If any task fails, DQP 212 retries the failed task with a new task-level ID (e.g., ++priorTaskID) and passes down the most recent prior task-level ID(s) to be aborted to the appropriate one(s) of compute node(s) 214 that determines the task(s) associated with the most recent prior task-level ID(s) is/are aborted before starting new work via retry. In embodiments, only explicit aborts are required to be communicated to transaction manager node 216, which is not required to consume rows in memory for each nest, parallel task saving significant storage space in memory. In other words, DQP 212 is configured and enabled to be the managing authority for vertex-level and task-level transactions which significantly improves system performance and reduces memory footprint. That is, embodiments provide for nested versioning semantics that do not require recording vertex-level and task-level transaction IDs at transaction manager node 216 other than in its abort list (e.g., via communication from DQP 212 and/or compute node(s) 214.

In embodiments, as noted above, the most recent prior task-level IDs, if not completed, may also be provided to the ones of compute node(s) 214. If the most recent prior tasks were completed, the most recent prior task-level ID values may be "NULL" or otherwise not provided. A non-NULL value for the most recent prior task-level ID(s) indicates that the most recent prior task(s) identified failed and needs to first be aborted before starting retry work. In this way, the need for DQP 212 to request the state of tasks at the fourth level of transactions before issuing retry work. Additionally, recording commits of completed nested tasks at the fourth level at transaction manager node 216 is not required, and only aborts are recorded thereat. Accordingly, if the most recent prior task-level ID is provided, the associated task will be aborted, as described in further detail below.

As described for embodiments, when nested transactions/tasks complete successfully, the results of the nested transactions/tasks, e.g., modified data, are locally committed by control node 210, DQP 212, and/or compute node(s) 214 without communications to transaction manager node 216. This allows for instant rollback of data versions when nested transactions/tasks fail and need to be retried. When user- or root-level transactions/queries complete, a completion call to an API of APIs 222 may be made to finalize completion with an operation 418, as in FIG. 4, to update version information via final or global commit for a data row(s) in a table(s). In some scenarios, queries or tasks thereof may not complete successfully at control node 210, DQP 212, and/or ones of compute node(s) 214. In these cases, an abort call, e.g., via APIs 222, may be initiated, and appropriate abort caches, described above, may be updated to reflect the abort, e.g., via updating the transaction end ID. When a query completes successfully, and in the case of a query that modifies or alters data will be committed, a commit call, e.g., via APIs 222, may be initiated, where operation 418 comprises a single-phase commit, and the commit table of cache 450 in FIG. 4, as described above, may be updated to reflect the commit, e.g., via updating the transaction end ID.

Figure 7:
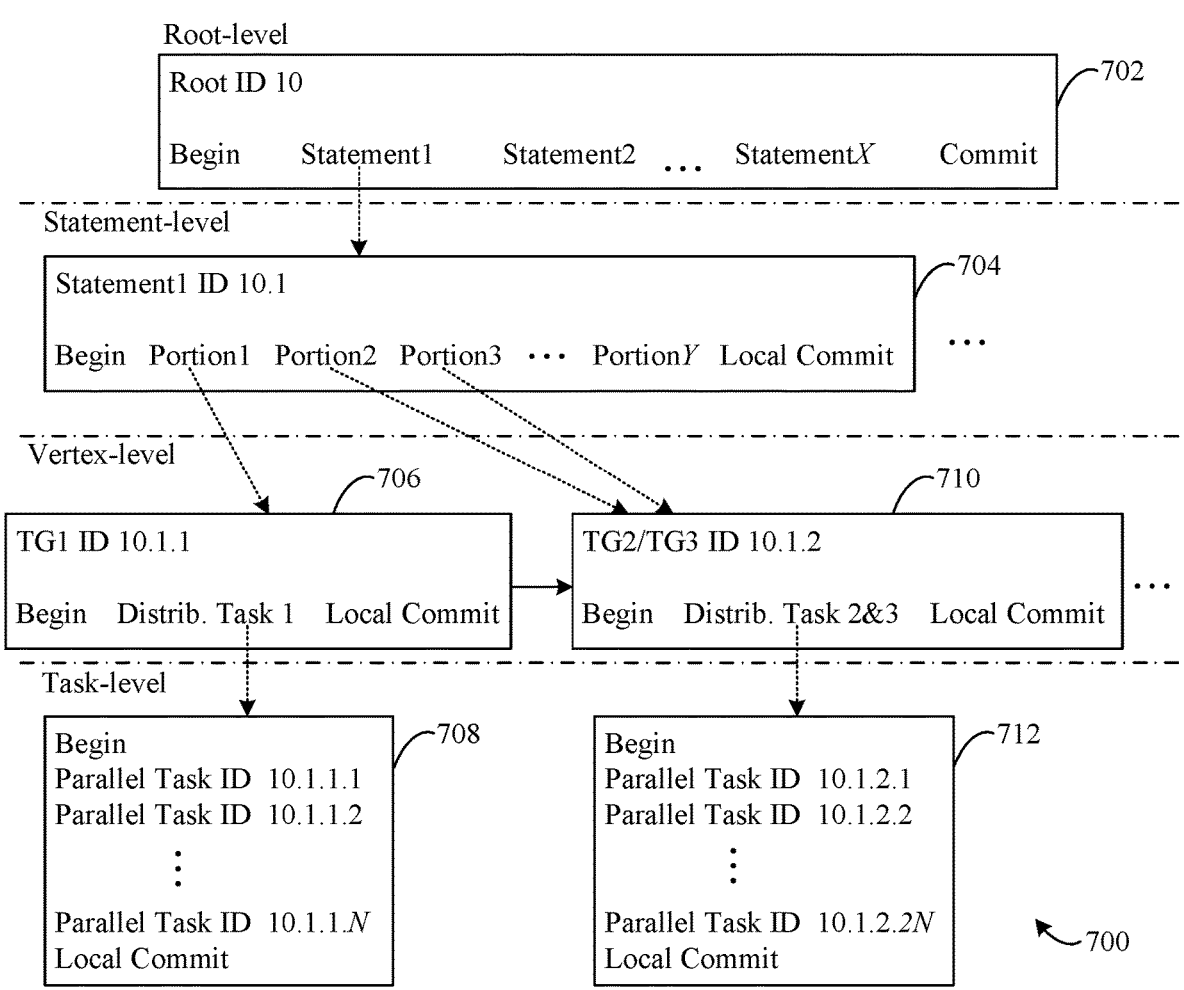
FIG. 7 shows a block diagram of nested transaction versioning for data visibility in nested transactions in distributed systems, in accordance with an example embodiment.

FIG. 7 will now be described. Embodiments herein support nested transactions and their hierarchical versioning, and also support and enable the ability to restart a task, transaction, and/or or query at a granular level. The described nested versioning semantics describe nested transactions/tasks that form a hierarchy of pieces of work for a query. A top-level transaction controls the entire scope of the query (i.e., the root-level transaction) and nested within it are lower-level transactions, or sub-/child-transactions, which are self-contained but dependent on parent-levels, and which can be completed or rolled back individually. According to embodiments, the nesting described herein can be continued over as many levels as there are abstraction layers in a given application, e.g., via the nesting of spheres of control, and is not limited to illustrative, exemplary descriptions herein, as would be understood by persons of skill in the relevant art(s) having the benefit of this disclosure.

The hierarchy of nested transactions may be conceptualized as a tree of transactions, the sub-transactions of which are either further nested or flat transactions. Transactions/tasks at the leaf level are flat transactions, and the distance from the root-level to the leaf-level, or task-level may be different for different parts of the tree. A sub-transaction can either commit or roll back (in case of failure), and its commit will not take effect globally, only locally, unless the parent transaction at the root-level also commits By induction, therefore, any sub-transaction may finally commit only if the root transaction commits, according to embodiments. The rollback of a transaction anywhere in the tree may cause all its child sub-transactions to roll back. Actual work can be done by any node or level in a tree, not just the leaf nodes. For instance, a root- or statement-level transaction may perform some work and then invoke sub-transaction thereof. Sub-transactions may be invoked concurrently as parallel, nested transaction, according to embodiments.

Referring now to FIG. 7, a block diagram 700 of nested transaction versioning for data visibility in nested transactions in distributed systems is shown, according to an example embodiment. Information of block diagram 700 may be stored in any storage described herein and/or at any component described for the systems/devices herein. FIG. 7 and a block diagram 700 will be described with respect to various FIGS. noted above.

Block diagram 700 illustrates nested transaction versioning, according to embodiments. As shown, a root level, a statement level, a vertex level, and a task level may be included, but embodiments are not so limited. A root-level transaction 702, also a user-level transaction, includes begin and commit operations and one or more statements of a received query: Statement1, Statement2, . . . , StatementX. Each statement is nested in root-level transaction 702, and upon successful completion of the statements, root-level transaction may globally commit Root-level transaction 702 also has a generated and assigned root-level ID, exemplarily shown as "10" for illustration, which may be generated as described herein, e.g., by a global counter. A control node, e.g., control node 210 of FIG. 2, may receive the query and initiate root-level transaction 702 via an API call to a transaction manager node, e.g., transaction manager node 216 of FIG. 2, as described above, and receive the root-level ID therefrom. The control node is then configured to determine statements nested in root-level transaction 702, and to initiate a first statement (e.g., Statement1). On successful completion of Statement1, processing may continue sequentially to Statement2 and so on through StatementX.

The control node initiates and handles statement-level transactions, which may include begin and local commit operations, as shown. Additionally, a given statement, such as Statement1 704 in the statement level, may include one or more nested portions thereof, illustrated by way of example as: Portion1, Portion2, Portion3, . . . , Portion Y. It should be noted that some portions of Statement1 704 do not represent sub-transactions thereof, in embodiments, and may be performed sequentially with respect to other portions by the control node. Statement1 704 also has a generated and assigned statement-level nested ID, exemplarily shown as "1" for illustration, under its parent root-level ID of "10," which may be generated as described herein, e.g., by the control node and a counter thereof.

Portions of Statement1 704 that are sub-transactions may be handled at the vertex- and task-levels illustrated in FIG. 7, e.g., by a DQP and/or compute nodes. For instance, as described herein, a DQP such as DQP 212 of FIG. 2 may receive portions of a statement-level transaction along with its associated root-level and statement-level nested IDs. The DQP may generate a DAG for which vertex-level nested IDs, and task-level nested IDs of tasks in task groups (TGs) of the DAG vertices, are generated. As illustrated, a first task group 706 that includes TG1 and a second task group 710 that includes TG2 and TG2 are generated by the DQP, and each include respective begin and local commit operations. First task group 706 that includes TG1 comprise a task (Task1) to be distributed to compute nodes for processing, e.g., compute node(s) 214 of FIG. 2, and a second task group 710 that includes TG2 and TG2 includes tasks (Task2 and Task3) to be distributed to compute nodes for processing. In an example where first task group 706 and second task group 710 of the task-level in FIG. 7 correspond to the TG1, and TG2 and TG3, respectively, in DAG 600 of FIGS. 6, TG2 and TG3 of second task group 710 will be processed in parallel and will only initiate processing on successful completion of TG1 in first task group 706 (i.e., will execution as nested, parallel tasks, sequentially after TG1 completion). The DQP is configured to generate and assign a vertex-level nested ID of "1" under the root-level ID of "10" and statement-level nested ID of "1" for first task group 706, and is configured to generate and assign a vertex-level nested ID of "2" under the root-level ID of "10" and statement-level nested ID of "1" for second task group 710, which may be generated as described herein, e.g., by the DQP and a counter(s) thereof.

At the task level, the DQP is configured to assign unique task-level nested IDs to each nested, parallel task, associated with a task group at the vertex-level (e.g., first task group 706, second task group 710, etc.) that will be provided to assigned ones of the compute nodes. As illustrated in FIG. 7, first nested, parallel tasks 708 and second nested, parallel tasks 712 respectively correspond to first task group 706 and second task group 710 at the vertex level. First nested, parallel tasks 708 and second nested, parallel tasks 712 each include begin and local commit operations. The DQP is configured to generate and assign unique task-level nested IDs under the root-level ID of "10," the statement-level nested ID of "1," and the vertex-level nested ID of "1" for each of first nested, parallel tasks 708 ("1" to "/V" as there is task group associated with first nested, parallel tasks 710), and is configured to generate and assign a vertex-level nested ID of "2" under the root-level ID of "10," the statement-level nested ID of "1," and the vertex-level nested ID of "2" for each of second nested, parallel tasks 712 ("1" to "2/V" as there are two task groups associated with second nested, parallel tasks 712), which may be generated as described herein, e.g., by the DQP and a counter(s) thereof.

As shown by way of example, first nested, parallel tasks 708 include fully-hierarchical parallel task IDs of "10.1.1.1," "10.1.1.2," . . . , "10.1.1.N," and second nested, parallel tasks 712 include fully-hierarchical parallel task IDs of "10.1.2.1," "10.1.2.2," . . . , "10.1.1.2N." Accordingly, the nested versioning semantics and IDs provide for a hardened versioning scheme, with three nested levels at the task-level, which may be stored as concatenated within a single variable associated with each parallel, nested task. Likewise, statement-level transactions include a single nested level, while the vertex-level includes two nested levels. In this way, embodiments enable the storage of the entire hierarchical version in a column of a data row that is modified by a given transaction/task, as described herein.

The local commit of a sub-transaction makes its results accessible only to its parent transactions in the hierarchy. The sub-transaction will finally or globally commit (i.e., release its results to the transaction manager node of the system) if it has locally committed itself locally and all its ancestors/parents up to the root level have also committed. That is, any sub-transaction can finally commit only if its associated root transaction commits, according to embodiments. The transaction manager node may, in embodiments, maintain a table with a single row for transactions that includes the transaction name, the root-level ID, and a nested ID that includes a bitwise packing of IDs of the nested levels. Regarding rollback, if a transaction or sub-transaction at any level of nesting is rolled back, all its sub-transactions through the hierarchy are also rolled back, independent of their local commit status. This may be applied recursively down the nesting hierarchy. Thus, if the root transaction is rolled back (e.g., because of a system crash), all its sub-transactions are also rolled back, whether or not they have already performed their local commit Regarding visibility rules based on the nested semantics and versioning described, changes to data made by a sub-transaction become visible to the parent transaction(s) upon the sub-transaction local commit Objects held by a parent transaction can be made accessible to its sub-transactions, in embodiments, and uncommitted work done by a parent transaction can also be made visible to its sub-transactions through the hierarchy. Changes made to data by a subtransaction are not visible to its siblings, i.e., other transactions/tasks executed concurrently such as parallel nested transactions, as described herein, according to embodiments. And through the nested version IDs and visibility rules, a transaction/task with a newer/later ID can see data of a transaction/task with an older/earlier ID and properly assume the work is locally committed; global commits via the transaction manager node are not required.

Additional details regarding aborts, rollbacks, retries, and data visibility rules are provided below.

Figure 8:
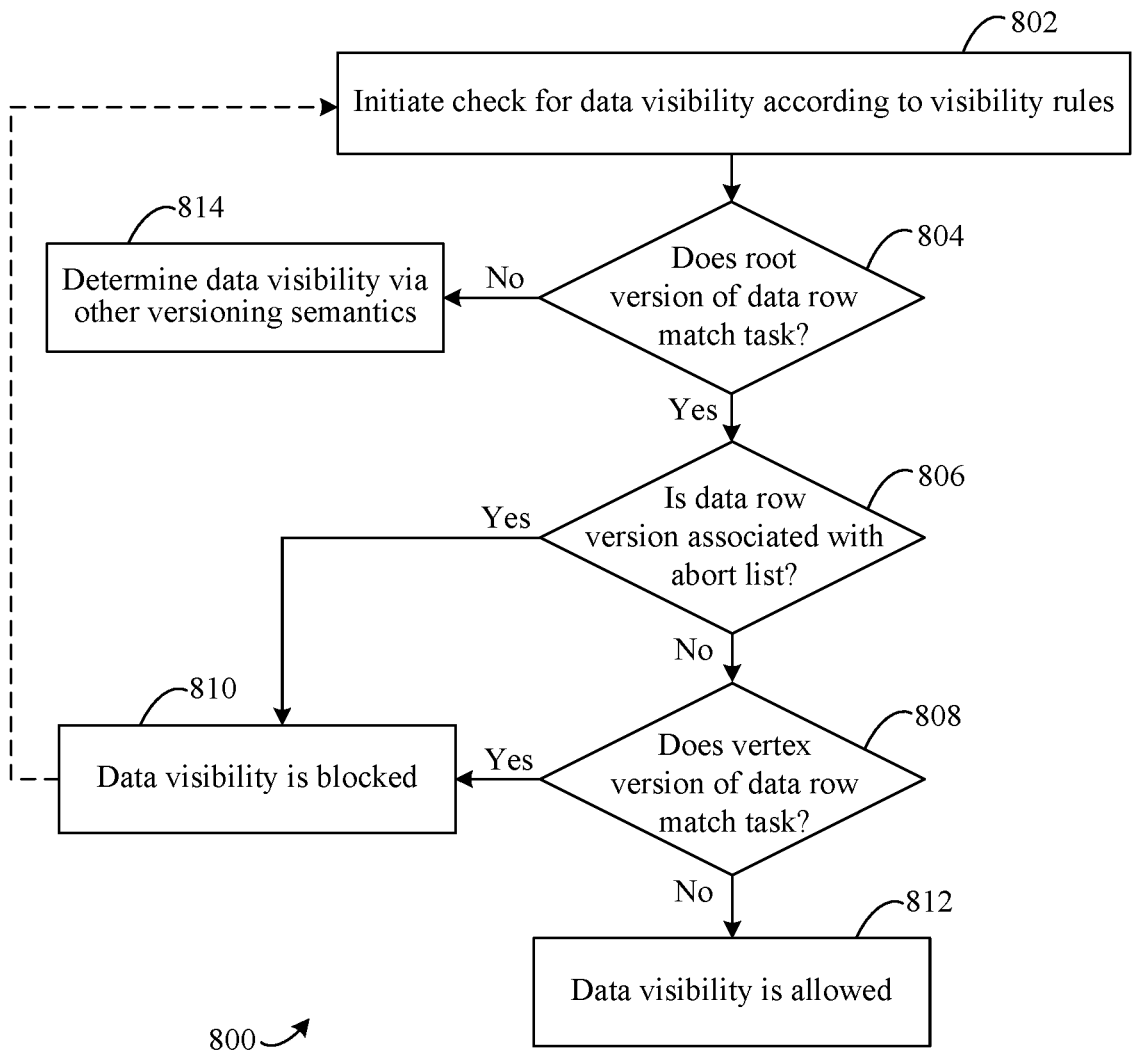
FIG. 8 shows a flow diagram for data visibility in nested transactions in distributed systems, in accordance with an example embodiment.

FIG. 8 shows a flowchart 800 for data visibility in nested transactions in distributed systems, according to an example embodiment. Further structural and operational examples will be apparent to persons skilled in the relevant art(s) based on the following descriptions. Flowchart 800 is described below, also with respect to FIG. 7 and block diagram 700 of nested transaction versioning.

Turning now to FIG. 8, flowchart 800 begins at step 802. In step 802, a check for data visibility according to visibility rules is initiated. For example, one or more systems, devices, and/or components described herein, e.g., control nodes, DQPs, and/or compute nodes, may perform nested transactions/tasks that modify data. According to the data visibility semantics and rules described herein, each system, device, and/or component that performs a nested transaction/task based on visible data is configured to initiate a data visibility determination. Determinations may made based on comparisons of fully-hierarchical nested IDs of the transactions/tasks, as described herein, against fully-hierarchical nested IDs stored in association with data in a row of a table and/or in a row of an abort list.

For instance, nested IDs for data modified by transactions at different levels of a query hierarchy may be encoded as values and stored in every data and metadata row, along with the root-level ID. Therefore, in embodiments, a bitwise comparison of a nested ID version in a row of data with a nested transaction ID determines if the row of data is visible to given unit-of-work transaction within same root transaction. That is, no secondary data structure lookup is needed for nested IDs, in embodiments, and only the root-level IDs are managed and maintained by transaction manager nodes where secondary structures are needed.

In view of flowchart 800, in step 804 it is determined if the root-level version encoded in a data row matches the nested ID of a given transaction/task. That is, is the nested transaction that is performing the work for which the data visibility check is made under the same root transaction as the nested transaction that last modified the data. If there is a match, flowchart 800 proceeds to step 806 for a next data visibility check; if the root-level transaction is different, flowchart 800 proceeds to step 814 where data visibility is determined via other versioning semantics such as snapshot isolation, RCSI, etc., managed by a transaction manager node (in other words, it is contemplated that access to the data may be allowed or blocked under other system conditions, e.g., if another root transaction has fully completed and been committed, data may be visible, but if the other root transaction, even having an older root transaction ID, remains active, data visibility therefor may be blocked).

From step 804 and a determination of a match above, flowchart 800 proceeds to step 806. In step 806, it is determined of the nested transaction ID that last modified the data corresponds to an aborted nested transaction/task. For example, if the row of data has a nested ID encoded therein that matches a nested ID in an abort list (which are encoded as fully-hierarchical nested IDs, e.g., 10.1, 10.1.1, 10.1.1.1, and/or the like, in embodiments), or if the row of data is otherwise denoted as being associated with an aborted nested transaction/task, then flowchart 800 proceeds to step 810 where data visibility is not allowed to the data row for the determining nested transaction/task. If the data row is not associated with an aborted transaction/task, flowchart 800 proceeds to step 808.

In step 808, it is determined if a vertex-level nested transaction encoded in the data row matches the nested ID of a given transaction/task. Because of the sequential execution of statements and of vertices/task groups based on a DAG, only a match in vertex-level nested IDs is required here to guarantee a proper data visibility determination as sibling transactions/tasks having a same vertex-level nested ID cannot see each other's data. Thus, if it is determined in step 808 that a vertex-level nested ID matches the data row and the active nested transaction/task seeking access to the data, flowchart 800 proceeds to step 810 where access to the data is blocked. Otherwise, flowchart 800 proceeds to step 812 where access to the data is allowed or granted. In embodiments, data that is marked to be ignored may be blocked from visibility.

It should also be noted that one or more of step 804, step 806, and/or step 808 may be iteratively performed for different rows of data in order to make a determination of data visibility in embodiments.

Figure 9:
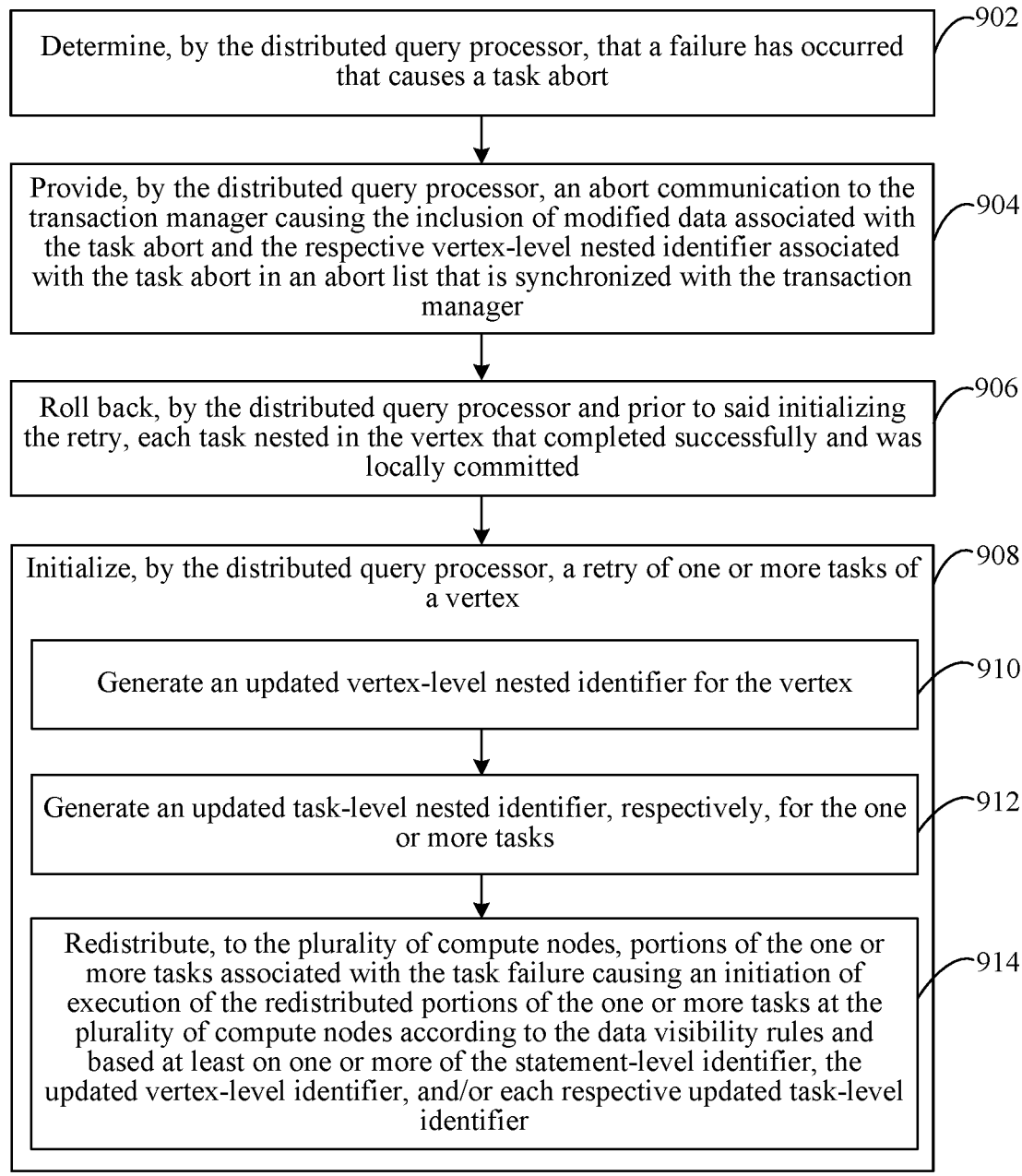
FIG. 9 shows a flowchart for data visibility in nested transactions in distributed systems, in accordance with an example embodiment.

FIG. 9 will now be described in the context of aborts, rollbacks, and retries. FIG. 9 shows a flowchart 900 for data visibility in nested transactions in distributed systems, according to an example embodiment. Further structural and operational examples will be apparent to persons skilled in the relevant art(s) based on the following descriptions. Flowchart 900 is described below, also with respect to FIG. 7 and block diagram 700 of nested transaction versioning and with respect to the systems described above.

In case of errors during performance of transactions/tasks, each nested level may be retried by aborting the previous level (including a transaction manager node communication) and issuing new (and different) nested ID(s) as described herein to retry a given unit of work. In embodiments, this may be the only requirement for transaction manager node communications in terms of aborted nested work. Because the task level, i.e., the fourth level, is associated with the lowest level of granular work (i.e., nested, parallel tasks), and the DQP is the single manager of these tasks on all backend compute nodes for the task level, an abort list may only be synchronized on the compute nodes when the DQP explicitly requests it, and the DQP may only request this synchronization from the transaction manager node if there was a task aborted; otherwise not. Thus, embodiments enable the transaction manager node to only manages and maintain the root-level ID to provide isolation versioning support at this highest level—the transaction manager node is not required to maintain nested IDs other than in the list of aborts, which greatly simplifies the management of nested transactions through reduced processing, memory footprint, and communication overhead.

Flowchart 900 begins at step 902. In step 902, it is determined by the distributed query processor that a failure has occurred that causes a task abort. For instance, DQP 212 of FIGS. 2 and 4 may be configured to receive an indication, or determine directed that a task, a compute node, the DQP itself, etc., has experienced a failure, including pauses, restarts, and/or the like.

In step 904, an abort communication is provided by the distributed query processor to the transaction manager node causing the inclusion of modified data associated with the task abort and the respective vertex-level nested identifier associated with the task abort in an abort list that is synchronized with the transaction manager node. For example, transaction manager node 216 of FIG. 2 may be notified by DQP 212, and/or one of compute node(s) 212 and/or control node 210 in embodiments, that a failure has occurred for a nested transaction/task. Transaction manager node 216 may update one or more lists in a cache thereof to record the failure and pending abort for the nested transaction/task and/or the data row associated therewith.

In step 906, each task nested in the vertex that completed successfully and was locally committed is rolled back by the distributed query processor prior to initializing a retry. For example, in the context of FIG. 7 and block diagram 700 of nested transaction versioning, consider that each nested parallel task in first nested, parallel tasks 708 successfully completed and locally committed except the nested, parallel task associated with task-level nested ID "10.1.1.2." The modified data for each of the successfully completed and locally committed tasks is rolled back, e.g., via DQP 212 and/or compute node(s) 214, to a prior valid version, and the data corresponding to task-level nested ID "10.1.1.2." is associated with an abort list, as noted above in step 904. Accordingly, the data versions prior to first nested, parallel tasks 708 are again available for retry based on the failure.

In step 908, a retry of one or more tasks of a vertex is initialized by the distributed query processor. For example, DQP 212 is configured to cause a retry to be performed for nested, parallel tasks that previously failed and were aborted based on data that was rolled back to a prior valid version in step 906. Step 908 may also include one or more of step 910, step 912, and/or step 914, in embodiments.

In step 910, an updated vertex-level nested identifier for the vertex is generated, and in step 912, an updated task-level nested identifier, respectively, for the one or more tasks is generated. For instance, in example above with respect to FIG. 7 and block diagram 700 of nested transaction versioning, a nested, parallel task failure associated with task-level nested ID "10.1.1.2" may cause its parent vertex-level nested ID, and/or each task-level nested ID thereunder, to be uniquely regenerated. That is, in embodiments, DQP 212 may generate new task-level nested IDs for first nested, parallel tasks 708 as "10.1.1.N+1," "10.1.1.N+2," "10.1.1.2N," while in other embodiments, DQP 212 may generate a vertex-level ID for first task group 706 as "10.1.Z," where 'Z' is the next available increment for vertex-level nested IDs under "10.1," as well as new task-level nested IDs for first nested, parallel tasks 708 as "10.1.Z.1," "10.1.Z.2," . . . , "10.1.Z.N." In embodiments for task-level only retries, the updated vertex-level nested ID may not be generated.

In step 914, portions of the one or more tasks associated with the task failure are redistributed to the plurality of compute nodes causing an initiation of execution of the redistributed portions of the one or more tasks at the plurality of compute nodes according to the data visibility rules and based at least on one or more of the statement-level identifier, the updated vertex-level identifier, and/or each respective updated task-level identifier. For example, DQP 212 is configured to redistribute the newly identified vertex and tasks from step 910 and step 912 to compute node(s) 214 for a retry.

Similarly, retries for statement-level transactions may be performed by a compute node herein.

Additionally, the vertex-level of the hierarchy may not be utilized for abort checks while determining data visibility, in embodiments, as aborts may happen at the task level or the statement level only (while it is contemplated that the embodiments herein are also enabled to perform vertex-level aborts and/or retries in various implementations). Thus, embodiments provide for the transaction manager node to ignore vertex-level nested IDs for the semantics described herein. Moreover, a DQP restart may require an abort of an entire parent statement, and likewise, any fatal task failure may lead to a restart of an entire statement. Therefore, the DQP is configured to generate vertex-level IDs and other associated maintenance information in-memory, relieving the transaction manager node of the need to persist such data and information, which would require extra communications and on-disk operations. The transaction manager node may, however, be aware of vertex-level nested IDs via API calls provided thereby for situations around nested data visibility. Similarly, the transaction manager node is not required to maintain or be aware of task-level nested IDs with the exception of abort states as noted herein. For example, when a DQP restart leads to statement restart, when a fatal task failure leads to statement restart, etc. And as task-level nested IDs are not used, in embodiments, to track active/commit states (instead root-level IDs are used, the transaction manager node may be unaware of the task-level nested IDs reducing maintenance overhead—instead, the DQP provides the task-level nested IDs as an in-memory operation for the DQP (i.e., because a restart of the DQP leads to a restart of a statement). This leads to additional performance increases in the transaction manager node does not need to record compute levels of control/compute nodes for abort or heartbeat protocols therewith. For similar reasons, the transaction manager node is not required to maintain statement-level nested IDs and associated information. If a compute node process restarts, the associated, parent user-level transaction is aborted, and this request can be served at the control node client layer itself; the transaction manager node only needs to maintain abort states explicitly communicated.

III. Example Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1 and system 200 in FIG. 2, along with any components and/or subcomponents thereof, as well any data structures, block diagrams, and operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 10:
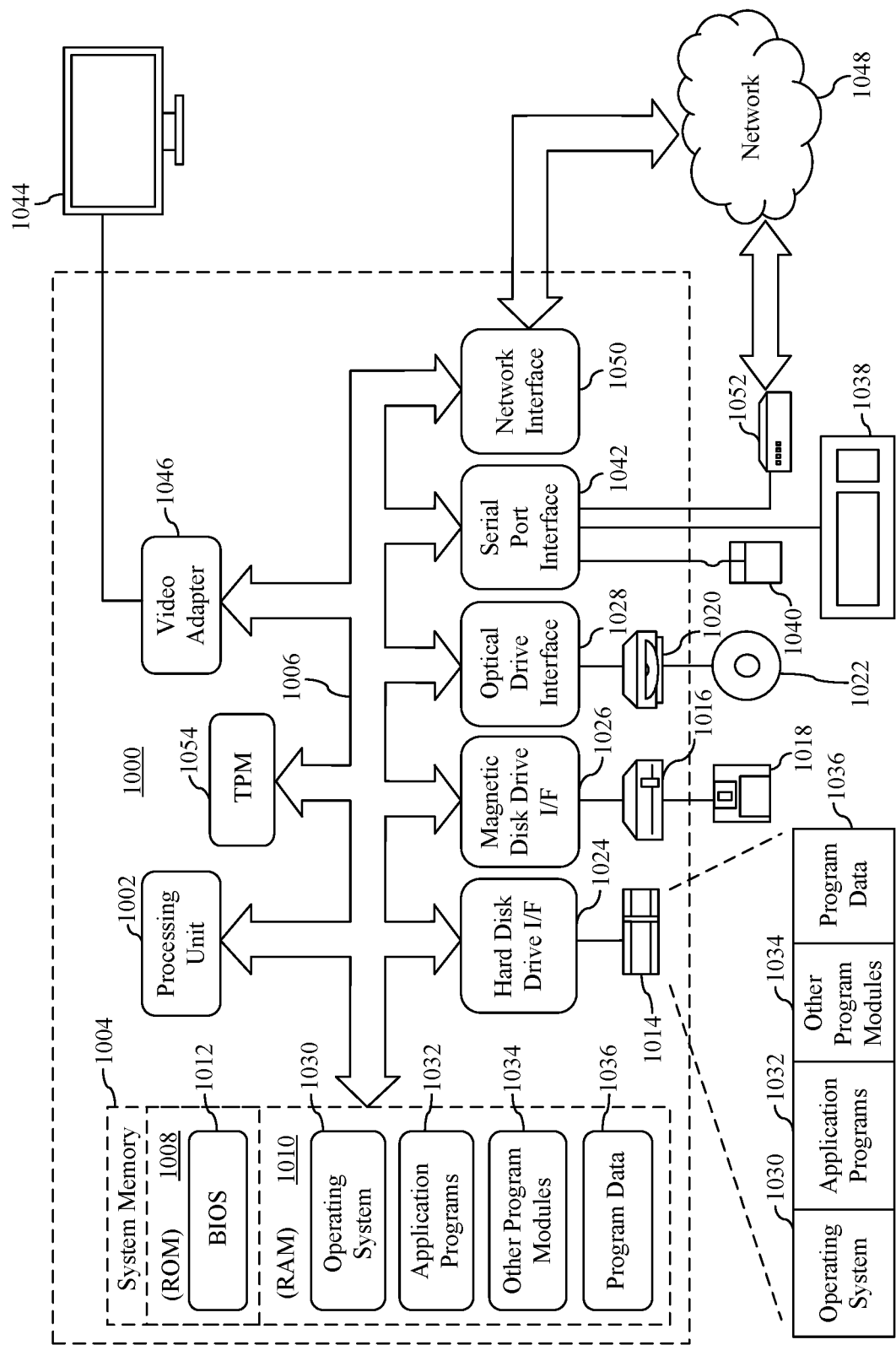
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices or systems similar to computing device 1000, or multiple instances of computing device 1000, in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, servers, and/or clusters, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as but not limited to, system 100 in FIG. 1 and system 200 in FIG. 2, along with any components and/or subcomponents thereof, as well any data structures, block diagrams, and operations of the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

TPM 1054 may be connected to bus 1006, and may be an embodiment of any TPM, as would be understood by one of skill in the relevant art(s) having the benefit of this disclosure. For example, TPM 1054 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for data visibility in nested transactions in distributed systems. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

The embodiments herein provide for the ability to restart at the DQP task level, and at the statement-level for control nodes in nested transactions, without aborting the root-level transaction. In embodiments, no ability for restarts may be required at DQP/DAG vertex-level transactions, simplifying the overall nested versioning process. Additionally, when a vertex of a DAG needs to see work from another vertex (in sequential processing) within the same statement, this visibility is the property of the DAG. DQP to compute node tasks are processed in parallel for a given vertex or task group of a DAG, and do not see each other's work, thus providing Halloween protection (i.e., a vertex of DAG will spin up parallel, nested transactions). For control nodes, a process restart lead to an abort of the root (user) level transaction, and a DQP process restart leads to an abort of a parent statement. A DQP may return a transient failure to its control node which may also abort the parent statement and restart the statement. Additionally, the DQP may return a fatal error to its control node which may lead to abort of the user transaction at the root level (e.g., user errors). Finally, a transient compute node task failure may be retried at the DQP in the vertex layer.

The embodiments herein enable nested transaction versioning for transactions/tasks that operate on data in distributed processing systems based on data visibility rules, enable scalability for distributed processing systems, and provide for local commits of nested transactions that enable aborts, rollbacks, and retries that enable more efficient operation of a single transaction manager in data warehouses and the like, while maintaining robust versioning of data through unique nested semantics. That is, the embodiments herein utilize a unique combination of nested versioning semantics, data visibility, and local tracking of nested versions that were previously not available for software-based services, query hosts, or data warehouses, much less for the specific embodiments described herein.

The additional examples and embodiments described in this Section may be applicable to examples disclosed in any other Section or subsection of this disclosure.

Embodiments in this description provide for systems, devices, and methods for data visibility in nested transactions in distributed systems. For instance, a system is described herein. The system is enabled and configured for data visibility in nested transactions in distributed systems, according to embodiments. The system includes a distributed query processor and a plurality of compute nodes. The distributed query processor is configured to generate a directed acyclic graph comprising vertices, each of which are nested in a statement-level transaction having a statement-level identifier, and each of which include at least one task; generate a vertex-level nested identifier, respectively, of a set of the vertices scheduled for parallel processing and of ones of the vertices scheduled for individual processing, and generate a task-level nested identifier, respectively, for each task nested in each of the vertices; and distribute, to the plurality of compute nodes, portions of the at least one task of the vertices causing an initiation of execution of the distributed portions at the plurality of compute nodes according to data visibility rules for the data that are based at least on the statement-level identifier, each respective vertex-level identifier, and each respective task-level identifier.

In an embodiment of the system, according to the data visibility rules: rows of the data identified in an abort list have blocked visibility; vertex-level visibility of the data is allowed for first data portions modified by the statement-level transaction, for second data portions of the data modified by another statement-level transaction having an older statement-level identifier than the statement-level identifier, and for third data portions of the data modified by a task of the vertices having an older vertex-level nested identifier than the vertex-level nested identifier; and task-level visibility of the data is allowed for any data portion which has corresponding vertex-level visibility for a vertex in which a task is included, and is blocked for fourth data portions of the data modified by other tasks also included in the vertex.

In an embodiment, the system further includes a transaction manager node and a control node, the transaction manager node being configured to generate a root transaction start identifier of a root transaction, associated with the data of the dataset, that is received and initiated by the control node; and the control node being configured to receive the root transaction start identifier from the transaction manager node; generate respective statement-level nested identifiers, comprising the statement-level nested identifier, of one or more statement-level transactions, comprising the statement level transaction, determined to be nested in the root transaction; initiate the statement-level transaction; and provide the root transaction start identifier, the statement-level nested identifier, and the statement-level transaction to the distributed query processor. In the embodiment, further according to the data visibility rules, statement-level transaction visibility of the data is allowed for fifth data portions of the data modified by the root transaction and blocked for other root transaction data portions of other root transactions that are active, and is allowed for the second data portions, and statement level transactions nested in the root transaction start identifier are sequentially executed.

In an embodiment of the system, the distributed query processor is configured to determine that a failure has occurred that causes a task abort; provide an abort communication to the transaction manager node causing the inclusion of modified data associated with the task abort and the respective vertex-level nested identifier associated with the task abort in an abort list that is synchronized with the transaction manager node; and initialize a retry of one or more tasks of a vertex that includes to generate an updated vertex-level nested identifier for the vertex, generate an updated task-level nested identifier, respectively, for the one or more tasks, and redistribute, to the plurality of compute nodes, portions of the one or more tasks associated with the task failure causing an initiation of execution of the redistributed portions of the one or more tasks at the plurality of compute nodes according to the data visibility rules and based at least on the statement-level identifier, the updated vertex-level identifier, and each respective updated task-level identifier.

In an embodiment of the system, the distributed query processor is configured to roll back, prior to said initialize the retry, each task nested in the vertex that completed successfully and was locally committed, and each task nested in the vertex for which a local write was performed without a local commit.

In an embodiment, the system further includes a transaction manager node that is configured to generate a root transaction start identifier of a root transaction, associated with the data of the dataset, under which the statement-level transaction having the statement-level identifier is nested, where each of the plurality of compute nodes are configured to locally commit individual task-level modifications to the data, having associated task-level nested identifiers, made by ones of the portions of the at least one task that complete successfully thereat, said locally commit individual task-level modifications being performed independently of communications with the transaction manager node; and where the distributed query processor is configured to locally commit each of the task-level modifications to the data, as associated with a corresponding vertex-level nested identifier of a vertex of the vertices under which the ones of the portions of the at least one task are performed based on successful completion thereof, said locally commit each of the task-level modifications being performed independently of communications with the transaction manager node, and initiate distributed performance at the plurality of compute nodes of next portions of at least one next task in a next vertex of the vertices that depends from the vertex and that has another corresponding vertex-level nested identifier that is newer than the corresponding vertex-level nested identifier of the vertex.

In an embodiment, the system further includes a transaction manager node that is configured to generate a root transaction start identifier of a root transaction, associated with the data of the dataset, under which the statement-level transaction having the statement-level identifier is nested, the root transaction start identifier being based on a value of a system counter, where values of statement-level identifiers, values of vertex-level identifiers, and values of task-level identifiers comprise transaction identifiers, are uniquely generated under their respective parent identifiers based on counters therefor, and are stored in corresponding rows of the data as stored versions in response to local commits; and where the data visibility rules are enforced in the system for nested transaction levels based at least on a comparison of the stored versions with at least one of the transaction identifiers.

A method performed by a computing system that includes a distributed query processor and a plurality of compute nodes is also described herein. The method is for data visibility in nested transactions in distributed systems, according to embodiments. The method includes generating, by the distributed query processor, a directed acyclic graph comprising vertices, each of which are nested in a statement-level transaction having a statement-level identifier, and each of which include at least one task; generating, by the distributed query processor, a vertex-level nested identifier, respectively, of a set of the vertices scheduled for parallel processing and of ones of the vertices scheduled for individual processing, and a task-level nested identifier, respectively, for each task nested in each of the vertices; and distributing, to the plurality of compute nodes from the distributed query processor, portions of the at least one task of the vertices causing an initiation of execution of the distributed portions at the plurality of compute nodes according to data visibility rules for the data that are based at least on the statement-level identifier, each respective vertex-level identifier, and each respective task-level identifier.

In an embodiment of the method, according to the data visibility rules, rows of the data identified in an abort list have blocked visibility; vertex-level visibility of the data is allowed for first data portions modified by the statement-level transaction, for second data portions of the data modified by another statement-level transaction having an older statement-level identifier than the statement-level identifier, and for third data portions of the data modified by a task of the vertices having an older vertex-level nested identifier than the vertex-level nested identifier; and task-level visibility of the data is allowed for any data portion which has corresponding vertex-level visibility for a vertex in which a task is included, and is blocked for fourth data portions of the data modified by other tasks also included in the vertex.

In an embodiment, the system includes a transaction manager node and a control node, and the method further includes generating, by the transaction manager node, a root transaction start identifier of a root transaction, associated with the data of the dataset, that is received and initiated by the control node; receiving, by the control node, the root transaction start identifier from the transaction manager node; generating, by the control node, respective statement-level nested identifiers, comprising the statement-level nested identifier, of one or more statement-level transactions, comprising the statement level transaction, determined to be nested in the root transaction; initiating, by the control node, the statement-level transaction; and providing, by the control node, the root transaction start identifier, the statement-level nested identifier, and the statement-level transaction to the distributed query processor; where, further according to the data visibility rules, statement-level transaction visibility of the data is allowed for fifth data portions of the data modified by the root transaction and blocked for other root transaction data portions of other root transactions that are active, and is allowed for the second data portions, wherein statement level transactions nested in the root transaction start identifier are sequentially executed.

In an embodiment, the method further includes determining, by the distributed query processor, that a failure has occurred that causes a task abort; providing, by the distributed query processor, an abort communication to the transaction manager node causing the inclusion of modified data associated with the task abort and the respective vertex-level nested identifier associated with the task abort in an abort list that is synchronized with the transaction manager node; and initializing, by the distributed query processor, a retry of one or more tasks of a vertex that includes: generating an updated vertex-level nested identifier for the vertex, generating an updated task-level nested identifier, respectively, for the one or more tasks, and redistributing, to the plurality of compute nodes, portions of the one or more tasks associated with the task failure causing an initiation of execution of the redistributed portions of the one or more tasks at the plurality of compute nodes according to the data visibility rules and based at least on the statement-level identifier, the updated vertex-level identifier, and each respective updated task-level identifier.

In an embodiment, the method further includes rolling back, by the distributed query processor and prior to said initializing the retry, each task nested in the vertex that completed successfully and was locally committed, and each task nested in the vertex for which a local write was performed without a local commit.

In an embodiment, the system further includes a transaction manager node, and the method further includes generating, by the transaction manager node, a root transaction start identifier of a root transaction, associated with the data of the dataset, under which the statement-level transaction having the statement-level identifier is nested; locally committing, by each of the plurality of compute nodes, individual task-level modifications to the data, having associated task-level nested identifiers, made by ones of the portions of the at least one task that complete successfully thereat, said locally committing individual task-level modifications being performed independently of communications with the transaction manager node; locally committing, by the distributed query processor, each of the task-level modifications to the data, as associated with a corresponding vertex-level nested identifier of a vertex of the vertices under which the ones of the portions of the at least one task are performed based on successful completion thereof, said locally committing each of the task-level modifications being performed independently of communications with the transaction manager node, and initiating, by the distributed query processor, distributed performance at the plurality of compute nodes of next portions of at least one next task in a next vertex of the vertices that depends from the vertex and that has another corresponding vertex-level nested identifier that is newer than the corresponding vertex-level nested identifier of the vertex.

In an embodiment, the system further includes a transaction manager node, and the method further includes generating, by the transaction manager node, a root transaction start identifier of a root transaction, associated with the data of the dataset, under which the statement-level transaction having the statement-level identifier is nested, the root transaction start identifier being based on a value of a system counter; where values of statement-level identifiers, values of vertex-level identifiers, and values of task-level identifiers comprise transaction identifiers, are uniquely generated under their respective parent identifiers based on counters therefor, and are stored in corresponding rows of the data as stored versions in response to local commits; and where the data visibility rules are enforced in the system for nested transaction levels based at least on a comparison of the stored versions with at least one of the transaction identifiers.

A computer-readable storage medium is also provided herein. The computer-readable storage medium has program instructions recorded thereon that, when executed by a processing system, perform a method. The method is for data visibility in nested transactions in distributed systems, according to embodiments. The method includes: generating a directed acyclic graph comprising vertices, each of which are nested in a statement-level transaction having a statement-level identifier, and each of which include at least one task; generating a vertex-level nested identifier, respectively, of a set of the vertices scheduled for parallel processing and of ones of the vertices scheduled for individual processing, and a task-level nested identifier, respectively, for each task nested in each of the vertices; and distributing, to the plurality of compute nodes, portions of the at least one task of the vertices causing an initiation of execution of the distributed portions at the plurality of compute nodes according to data visibility rules for the data that are based at least on the statement-level identifier, each respective vertex-level identifier, and each respective task-level identifier.

In an embodiment of the computer-readable storage medium, according to the data visibility rules rows of the data identified in an abort list have blocked visibility; vertex-level visibility of the data is allowed for first data portions modified by the statement-level transaction, for second data portions of the data modified by another statement-level transaction having an older statement-level identifier than the statement-level identifier, and for third data portions of the data modified by a task of the vertices having an older vertex-level nested identifier than the vertex-level nested identifier; and task-level visibility of the data is allowed for any data portion which has corresponding vertex-level visibility for a vertex in which a task is included, and is blocked for fourth data portions of the data modified by other tasks also included in the vertex.

In an embodiment of the computer-readable storage medium, the method further includes generating a root transaction start identifier of a root transaction, associated with the data of the dataset, that is received and initiated by the control node; receiving the root transaction start identifier from the transaction manager node; generating respective statement-level nested identifiers, comprising the statement-level nested identifier, of one or more statement-level transactions, comprising the statement level transaction, determined to be nested in the root transaction; initiating the statement-level transaction; and providing the root transaction start identifier, the statement-level nested identifier, and the statement-level transaction to the distributed query processor; where, further according to the data visibility rules, statement-level transaction visibility of the data is allowed for fifth data portions of the data modified by the root transaction and blocked for other root transaction data portions of other root transactions that are active, and is allowed for the second data portions, wherein statement level transactions nested in the root transaction start identifier are sequentially executed.

In an embodiment of the computer-readable storage medium, the method further includes determining that a failure has occurred that causes a task abort; providing an abort communication to the transaction manager node causing the inclusion of modified data associated with the task abort and the respective vertex-level nested identifier associated with the task abort in an abort list that is synchronized with the transaction manager node; and initializing a retry of one or more tasks of a vertex that includes: generating an updated vertex-level nested identifier for the vertex, generating an updated task-level nested identifier, respectively, for the one or more tasks, and redistributing, to the plurality of compute nodes, portions of the one or more tasks associated with the task failure causing an initiation of execution of the redistributed portions of the one or more tasks at the plurality of compute nodes according to the data visibility rules and based at least on the statement-level identifier, the updated vertex-level identifier, and each respective updated task-level identifier.

In an embodiment of the computer-readable storage medium, the method further includes rolling back, prior to said initializing the retry, each task nested in the vertex that completed successfully and was locally committed, and each task nested in the vertex for which a local write was performed without a local commit.

In an embodiment of the computer-readable storage medium, the method further includes generating a root transaction start identifier of a root transaction, associated with the data of the dataset, under which the statement-level transaction having the statement-level identifier is nested; locally committing individual task-level modifications to the data, having associated task-level nested identifiers, made by ones of the portions of the at least one task that complete successfully thereat, said locally committing individual task-level modifications being performed independently of communications with the transaction manager node; locally committing each of the task-level modifications to the data, as associated with a corresponding vertex-level nested identifier of a vertex of the vertices under which the ones of the portions of the at least one task are performed based on successful completion thereof, said locally committing each of the task-level modifications being performed independently of communications with the transaction manager node, and initiating distributed performance at the plurality of compute nodes of next portions of at least one next task in a next vertex of the vertices that depends from the vertex and that has another corresponding vertex-level nested identifier that is newer than the corresponding vertex-level nested identifier of the vertex.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A compute node comprising:
a processor;
a memory device that stores program code structured to cause the processor to:
receive, from a distributed query processor, a first query task and a hierarchical nested identifier, the hierarchical nested identifier including at least a statement-level identifier associated with a statement-level transaction, a vertex-level identifier associated with a vertex of a directed acyclic graph, and a task-level identifier associated with the first query task in the directed acyclic graph, the vertex-level identifier nested between the statement-level identifier and the task-level identifier;
determine a first visible version of data in a queried database according to data visibility rules based at least on the transaction-level identifier, the vertex-level identifier, and the task-level identifier; and
execute the first query task on the first visible version of data.

2. The compute node of claim 1, wherein, according to the data visibility rules:
rows of the data identified in an abort list have blocked visibility;
vertex-level visibility of the data is allowed for first data portions modified by the statement-level transaction, for second data portions of the data modified by another statement-level transaction having an older statement-level identifier than the statement-level identifier, and for third data portions of the data modified by a task of the vertices having an older vertex-level nested identifier than the vertex-level nested identifier; and
task-level visibility of the data is allowed for any data portion which has corresponding vertex-level visibility for a vertex in which a task is included, and is blocked for fourth data portions of the data modified by other tasks also included in the vertex.

3. The compute node of claim 1, wherein, to determine a visible version of data according to data visibility rules, the program code is structured to cause the processor to:
compare the hierarchical nested identifier with hierarchical identity information encoded in a data column of stored rows of the data.

4. The compute node of claim 1, wherein the program code is further structured to cause the processor to:
locally commit individual task-level modifications to the data that complete successfully, wherein said locally commit is performed independent of communication with a transaction manager node.

5. The compute node of claim 1, wherein the program code is further structured to cause the processor to:
receive, from the distributed query processor, a retry task associated with a task-level abort and an updated hierarchical nested identifier, the updated hierarchical nested identifier including at least the statement-level identifier, the vertex-level identifier, and an updated task-level identifier associated with the retry task;
determine a second visible version of data according to data visibility rules based at least on the transaction-level identifier, the vertex-level identifier, and the update task-level identifier; and
execute the retry task on the second visible version of data.

6. The compute node of claim 1, wherein the program code is further structured to cause the processor to:
receive, from the distributed query processor, a retry task associated with a vertex-level abort and an updated hierarchical nested identifier, the updated hierarchical nested identifier including at least the statement-level identifier, an updated vertex-level identifier associated with an aborted vertex, and an updated task-level identifier associated with the retry task;
determine a second visible version of data according to data visibility rules based at least on the transaction-level identifier, the updated vertex-level identifier, and the update task-level identifier; and execute the retry task on the second visible version of data.

7. The compute node of claim 1, wherein the program code is further structured to cause the processor to:
maintain a local cache of aborted transactions; and
synchronize, at each query, the aborted transactions with a transaction manager node.

8. A method performed by a compute node, the method comprising:
receiving, from a distributed query processor, a first query task and a hierarchical nested identifier, the hierarchical nested identifier including at least a statement-level identifier associated with a statement-level transaction, a vertex-level identifier associated with a vertex of a directed acyclic graph, and a task-level identifier associated with the first query task in the directed acyclic graph, the vertex-level identifier nested between the statement-level identifier and the task-level identifier;
determining a first visible version of data in a queried database according to data visibility rules based at least on the transaction-level identifier, the vertex-level identifier, and the task-level identifier; and
executing the first query task on the first visible version of data.

9. The method of claim 8, wherein, according to the data visibility rules:
rows of the data identified in an abort list have blocked visibility;
vertex-level visibility of the data is allowed for first data portions modified by the statement-level transaction, for second data portions of the data modified by another statement-level transaction having an older statement-level identifier than the statement-level identifier, and for third data portions of the data modified by a task of the vertices having an older vertex-level nested identifier than the vertex-level nested identifier; and
task-level visibility of the data is allowed for any data portion which has corresponding vertex-level visibility for a vertex in which a task is included, and is blocked for fourth data portions of the data modified by other tasks also included in the vertex.

10. The method of claim 8, wherein said determining a first visible version of data according to data visibility rules comprises:
comparing the hierarchical nested identifier with hierarchical identity information encoded in a data column of stored rows of the data.

11. The method of claim 8, further comprising:
locally committing individual task-level modifications to the data that complete successfully, wherein said locally commit is performed independent of communication with a transaction manager node.

12. The method of claim 8, further comprising:
receiving, from the distributed query processor, a retry task associated with a task-level abort and an updated hierarchical nested identifier, the updated hierarchical nested identifier including at least the statement-level identifier, the vertex-level identifier, and an updated task-level identifier associated with the retry task;
determining a second visible version of data according to data visibility rules based at least on the transaction-level identifier, the vertex-level identifier, and the update task-level identifier; and
executing the retry task on the second visible version of data.

13. The method of claim 8, further comprising:
receiving, from the distributed query processor, a retry task associated with a vertex-level abort and an updated hierarchical nested identifier, the updated hierarchical nested identifier including at least the statement-level identifier, an updated vertex-level identifier associated with an aborted vertex, and an updated task-level identifier associated with the retry task;
determining a second visible version of data according to data visibility rules based at least on the transaction-level identifier, the updated vertex-level identifier, and the update task-level identifier; and
executing the retry task on the second visible version of data.

14. The method of claim 8, further comprising:
maintaining a local cache of aborted transactions; and
synchronizing, at each query, the aborted transactions with a transaction manager node.

15. A computer-readable storage medium comprising computer-executable instructions that, when executed by a processor of a compute node, cause the processor of the compute node to:
receive, from a distributed query processor, a first query task and a hierarchical nested identifier, the hierarchical nested identifier including at least a statement-level identifier associated with a statement-level transaction, a vertex-level identifier associated with a vertex of a directed acyclic graph, and a task-level identifier associated with the first query task in the directed acyclic graph, the vertex-level identifier nested between the statement-level identifier and the task-level identifier;
determine a visible version of data in a queried database according to data visibility rules based at least on the transaction-level identifier, the vertex-level identifier, and the task-level identifier; and
execute the first query task on the visible version of data.

16. The computer-readable storage medium of claim 15, wherein, according to the data visibility rules:
rows of the data identified in an abort list have blocked visibility;
vertex-level visibility of the data is allowed for first data portions modified by the statement-level transaction, for second data portions of the data modified by another statement-level transaction having an older statement-level identifier than the statement-level identifier, and for third data portions of the data modified by a task of the vertices having an older vertex-level nested identifier than the vertex-level nested identifier; and
task-level visibility of the data is allowed for any data portion which has corresponding vertex-level visibility for a vertex in which a task is included, and is blocked for fourth data portions of the data modified by other tasks also included in the vertex.

17. The computer-readable storage medium of claim 15, wherein, to determine a visible version of data according to data visibility rules, the computer-executable instructions, when executed by the processor, further cause the processor to:
compare the hierarchical nested identifier with hierarchical identity information encoded in a data column of stored rows of the data.

18. The computer-readable storage medium of claim 15, wherein the computer-executable instructions, when executed by the processor, further cause the processor to:
locally commit individual task-level modifications to the data that complete successfully, wherein said locally commit is performed independent of communication with a transaction manager node.

19. The computer-readable storage medium of claim 15, wherein the computer-executable instructions, when executed by the processor, further cause the processor to:
- receive, from the distributed query processor, a retry task associated with a task-level abort and an updated hierarchical nested identifier, the updated hierarchical nested identifier including at least the statement-level identifier, the vertex-level identifier, and an updated task-level identifier associated with the retry task;
- determine a second visible version of data according to data visibility rules based at least on the transaction-level identifier, the vertex-level identifier, and the update task-level identifier; and
- execute the retry task on the second visible version of data.

20. The computer-readable storage medium of claim 15, wherein the computer-executable instructions, when executed by the processor, further cause the processor to:
- receive, from the distributed query processor, a retry task associated with a vertex-level abort and an updated hierarchical nested identifier, the updated hierarchical nested identifier including at least the statement-level identifier, an updated vertex-level identifier associated with an aborted vertex, and an updated task-level identifier associated with the retry task;
- determine a second visible version of data according to data visibility rules based at least on the transaction-level identifier, the updated vertex-level identifier, and the update task-level identifier; and
- execute the retry task on the second visible version of data.

* * * * *